United States Patent
Kogan et al.

(10) Patent No.: US 9,981,378 B2
(45) Date of Patent: May 29, 2018

(54) HANDHELD ROBOT OPERATION UNIT WITH AN ADAPTER DEVICE FOR A MOBILE TERMINAL DEVICE

(71) Applicant: KUKA Roboter GmbH, Augsburg (DE)

(72) Inventors: Yevgen Kogan, Augsburg (DE); Martin Riedel, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days. days.

(21) Appl. No.: 15/097,639

(22) Filed: Apr. 13, 2016

(65) Prior Publication Data

US 2016/0297067 A1    Oct. 13, 2016

(30) Foreign Application Priority Data

Apr. 13, 2015    (DE) .................. 10 2015 206 571

(51) Int. Cl.
| | |
|---|---|
| *B25J 9/16* | (2006.01) |
| *B25J 13/02* | (2006.01) |
| *B25J 13/06* | (2006.01) |
| *G05B 19/409* | (2006.01) |

(52) U.S. Cl.
CPC .............. *B25J 9/161* (2013.01); *B25J 13/02* (2013.01); *B25J 13/06* (2013.01); *G05B 19/409* (2013.01); *G05B 2219/35488* (2013.01); *G05B 2219/36159* (2013.01); *G05B 2219/36168* (2013.01)

(58) Field of Classification Search
CPC . B25J 9/161; B25J 13/02; B25J 13/06; G05B 2219/36159
See application file for complete search history.

(56) References Cited

U.S. PATENT DOCUMENTS

| | | | | |
|---|---|---|---|---|
| 6,504,710 B2* | 1/2003 | Sutton | ................. | B60R 11/0252 |
| | | | | 312/223.1 |
| 6,697,681 B1* | 2/2004 | Stoddard | ................ | B25J 9/1656 |
| | | | | 345/156 |
| 6,778,380 B2* | 8/2004 | Murray, Jr. | .......... | H01H 9/0235 |
| | | | | 340/12.55 |
| 7,967,269 B2* | 6/2011 | Liu | ........................ | F16M 13/02 |
| | | | | 248/176.3 |

(Continued)

FOREIGN PATENT DOCUMENTS

| | | |
|---|---|---|
| CN | 104373791 A | 2/2015 |
| JP | 2016060018 A | 4/2016 |

(Continued)

OTHER PUBLICATIONS

European Patent Office; Search Report in European Patent Application No. 16163806.9 dated Feb. 16, 2017; 7 pages.

(Continued)

*Primary Examiner* — David M Sinclair
*Assistant Examiner* — Robert Brown
(74) *Attorney, Agent, or Firm* — Wood Herron & Evans LLP

(57) ABSTRACT

A handheld robot operation unit comprises a basic safety control device, a mobile terminal device, and a holder configured to mount the mobile terminal device on the basic safety control device. The holder comprises at least one adapter device configured to mechanically connect the mobile terminal device to the basic safety control device.

19 Claims, 15 Drawing Sheets

(56) References Cited

U.S. PATENT DOCUMENTS

| | | | | |
|---|---|---|---|---|
| 8,240,628 B2* | 8/2012 | Huang | ............... | F16M 11/041 |
| | | | | 248/122.1 |
| 8,570,273 B1* | 10/2013 | Smith | ............... | G06F 3/0338 |
| | | | | 345/156 |
| D693,352 S * | 11/2013 | Gelsomini | ............... | D14/447 |
| 2007/0164696 A1* | 7/2007 | Henne | ............... | G05B 19/427 |
| | | | | 318/568.13 |
| 2009/0129003 A1* | 5/2009 | Bruck | ............... | G08C 17/02 |
| | | | | 361/679.4 |
| 2013/0235521 A1* | 9/2013 | Burch | ............... | G06F 1/1635 |
| | | | | 361/679.48 |
| 2015/0051736 A1* | 2/2015 | Mu | ............... | B25J 13/06 |
| | | | | 700/264 |
| 2015/0174767 A1* | 6/2015 | Som | ............... | B25J 13/06 |
| | | | | 700/257 |
| 2016/0001176 A1* | 1/2016 | Chen | ............... | A63F 13/98 |
| | | | | 3/98 |
| 2016/0114478 A1* | 4/2016 | Wu | ............... | B25J 13/006 |
| | | | | 700/264 |
| 2017/0089513 A1* | 3/2017 | Pan | ............... | F16M 13/022 |

FOREIGN PATENT DOCUMENTS

| | | |
|---|---|---|
| WO | 03/088011 A2 | 10/2003 |
| WO | 2013029658 A1 | 3/2013 |

OTHER PUBLICATIONS

German Patent Office; Office Action in German Patent Application No. 10 2015 206 571.5 dated Jan. 19, 2016; 5 pages.

Chinese Patent Office; Office Action in Chinese Patent Application No. 2016102285230 dated Nov. 3, 2017; 8 pages.

* cited by examiner

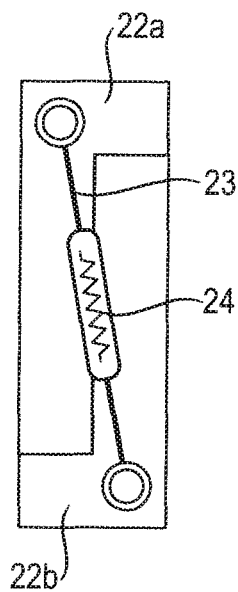
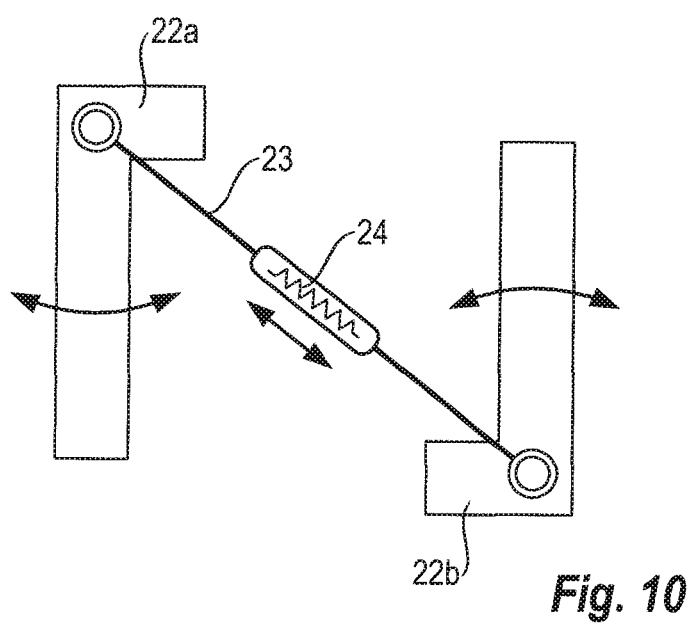
*Fig. 9*
*Fig. 10*
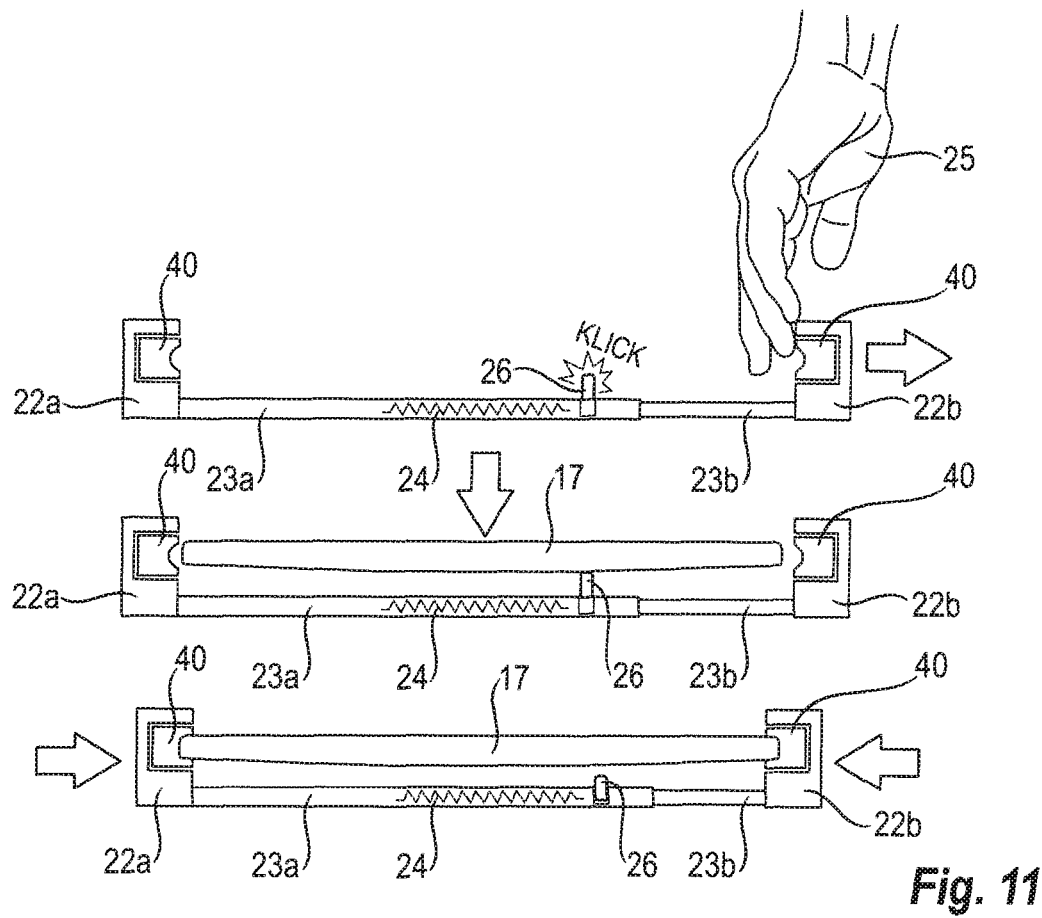
*Fig. 11*

HANDHELD ROBOT OPERATION UNIT WITH AN ADAPTER DEVICE FOR A MOBILE TERMINAL DEVICE

CROSS-REFERENCE TO RELATED APPLICATIONS

This application claims the benefit of priority under 35 U.S.C. § 119(a) to German Patent Application DE 10 2015 206 571.5, filed Apr. 13, 2015 (pending), the disclosure of which is hereby incorporated by reference in its entirety.

TECHNICAL FIELD

The invention concerns a handheld robot operation unit, comprising a basic safety control device, a mobile terminal device and a holder, which is configured to mount the mobile terminal device on the basic safety control device.

BACKGROUND

WO 03/088011 A2 describes a mobile electronic computing unit that can be held in one hand, in particular in the manner of a personal data assistant (PDA) or hand-held computer, with a software-controlled processor unit, at least one memory device connected to it for the storage of software modules and/or data to be processed, at least one display device for the visually detectable output of information and with at least one input device to at least affect the operational functions of the computing unit and/or to input data, whereby the display device and the input device are combined in terms of their components or functions in the form of a touch-sensitive screen, for example a touchscreen, and with at least one standardly configured interface on the housing of the arithmetic unit, provided for connecting peripheral, electronic or electrical devices, such as e.g. a personal computer, whereby the standardly configured interface or an independently configured interface is provided for connecting at least one safety switching element in the form of an emergency off switch and/or an enabling switch.

SUMMARY

The object of the invention is to provide a handheld robot operation unit, in particular a standardized handheld robot operation unit, which can be configured and/or equipped with a variety of in particular commercially available mobile terminal devices.

The object of the invention is solved by a handheld robot operation unit, comprising a basic safety control device, a mobile terminal device and a holder, which is configured to mount the mobile terminal device on the basic safety control device, in which the holder comprises at least one adapter device, which is configured to mechanically connect the mobile terminal device to the basic safety control device.

The object of the invention is in particular solved by a handheld robot operation unit, comprising a basic safety control device, a mobile terminal device and a holder, which is configured to mount the mobile terminal device on the basic safety control device, in which the holder comprises at least one adapter device, which is configured to be able to selectively connect one of several possible, different mobile terminal devices, in particular mobile terminal devices of different model types and/or sizes, to the same basic safety control device, and to be able to mechanically connect the selected mobile terminal device to the basic safety control device in an inserted or attached condition.

The handheld robot operation unit can in particular be a robot teach pendant. The robot teach pendant can also be a handheld manipulator operation unit or be referred to as one. The adapter device can be designed to be modifiable, in particular adjustable, to selectively be able to accommodate one of several possible, different mobile terminal devices, in particular mobile terminal devices of different model types and/or sizes, whereby only this one modifiable, in particular adjustable, adapter device is mechanically connected to the basic safety control device.

Alternatively, a number of different adapter devices can be provided, whereby in particular a separate adapter device, customized to the respective model and/or its size, can be provided for each selectable mobile terminal device, and whereby, in terms of a mechanical connection of the adapter device to the same basic safety control device, each of this number of different adapter devices is configured the same.

Since the holder comprises at least one adapter device, which is configured to mechanically connect the mobile terminal device to the basic safety control device, in particular commercially available mobile terminal devices, such as tablet computers or smart phones, can be used as safe input devices to operate the robot. This is interesting, in particular because many new advanced control concepts are very quickly technically implemented in commercially available mobile terminal devices. With an inventive handheld robot operation unit, an existing basic safety control device can easily and quickly be equipped with an advanced input device, or can be retrofitted for advanced input devices.

The goal of the invention is to provide an industry-suited handheld robot operation unit, which can be kept at an advanced level with respect to the control standard and safety requirements, as well as environmental effects and/or the ergonomics of operation. Since the adapter device makes it possible to connect current, commercially available mobile terminal devices to an existing basic safety control device, the very high-performance currently commercially available mobile terminal devices can be used to control the industry-suited handheld robot operation unit.

By means of the adapter device, differently designed mobile terminal devices can be mechanically connected to the in particular standardized basic safety control device. By means of the adapter device, the mobile terminal device can even be selectively separated or connected manually from the basic safety control device by a user. The two devices, i.e. the standardized basic safety control device and the selected mobile terminal device, can therefore be combined with one another, or each individual device can be used separately. In this respect, the basic safety control device is autonomously safely operational, and the removed mobile terminal device is also independently operational, albeit not in safe technology. Consequently three different, fully adequate, operating devices can be provided for different situations.

Unlike the known solutions, the present invention gives the user the option of manually controlling or stopping the robot at any time using the common and/or minimal basic functions by means of a base operating device that remains with the robot, i.e. with only the basic safety control device. By mechanical and control technological coupling with a mobile terminal device, such as a tablet computer or smart phone, this simple base operating device, i.e. the basic safety control device, can be expanded to a very high value and multi-functional handheld operation unit, which is quite well-suited even for complicated and laborious programming, analysis and service work. For separate operation of the mobile terminal device, e.g. the tablet computer, in other words detached from the base operating device, i.e. detached from the basic safety control device, this mobile terminal device is portable and can be used in a place-bound manner, e.g. at the work place, in the office or in a conference room, individually or connected to external monitors or external input devices, for example, to prepare work steps or programs for the robot offline, to analyze acquired data and/or to query status reports or states of one or more robots using remote servicing. In this case the mobile terminal device can also be used as a user-bound, personal input device for the handheld robot operation unit. This has advantages, such as that a number of persons in a variety of roles can work on the same computer, whereby the optimal configuration for each respective person, e.g. regarding the software features, the user data, such as cookies, accounts, and/or access rights, can be individually compiled on the mobile terminal device, or can be pulled up again later.

Thus, in all the respective implementations of the adapter device, a number of, in particular structurally identical mobile terminal devices can be allocated to the basic safety control device. A single adapter device can remain on the basic safety control device, for example, and the number of structurally identical mobile terminal devices, for example the individual terminal devices of the various persons, can selectively be inserted into the adapter device. Alternatively, each individual, in particular structurally identical terminal device can be provided with its own adapter device, whereby the number of structurally identical mobile terminal devices, for example the individual terminal devices of different persons, can, together with the individual adapter device, selectively be mechanically connected to the basic safety control device.

In another aspect of the invention, a number of different adapter devices can be allocated to one standard basic safety control device, whereby, for mechanical connection to the basic safety control device, the adapter devices comprise identical coupling means or holding means and in each case one of the different adapter devices comprises individual coupling means or holding means to attach one specific one of the number of different mobile terminal devices. In this way the same basic safety control device can selectively be operated with a variety of types of mobile terminal devices.

The adapter device can comprise at least one adjustable holding element, which is configured in a closed position of the adjustable holding element to connect the mobile terminal device with the basic safety control device in a form-locking and/or force-locking manner, in particular on at least two diagonally opposite corners of the mobile terminal device, and in an open position of the adjustable holding element to mechanically release the mobile terminal device to separate it from the basic safety control device.

The holding element can, in particular, be configured for manual operation. A user, for example a robot programmer, can thus manually, without needing tools, detach the mobile terminal device from the basic safety control device or connect it to the basic safety control device.

The basic safety control device can comprise a first handheld operation unit part and at least one, relative to the first handheld operation unit part adjustable, second handheld operation unit part, whereby the handheld operation unit parts are adjustably coupled to one another in such a way that the handheld operation unit parts in a basic arrangement form a contour-reduced handheld robot operation unit, and in a contour-expanded accommodation arrangement, in which the second handheld operation unit part is offset from the basic arrangement relative to the first handheld operation unit part the handheld robot operation unit is configured to accommodate the mobile terminal device by means of the adapter device.

The first handheld operation unit part and the second handheld operation unit part can exhibit a particular form, whereby the shapes of the respective forms supplement one another in the contour-reduced arrangement of the handheld operation unit part. The two handheld operation unit parts can fit together like a puzzle, so to speak, and form a new basic shape in the contour-reduced arrangement. The first handheld operation unit part and the second handheld operation unit part can, in particular, exhibit such a size and/or shape that the handheld operation unit parts in the contour-reduced arrangement can be grasped, in particular enclosed, with one hand of a user.

The basic safety control device can, in particular the first handheld operation unit part and/or the second handheld operation unit part can comprise at least one emergency stop trigger means, at least one enabling device, at least one operating mode selector and/or a display means, in particular an electronic display.

At least the at least one emergency stop trigger means, the at least one enabling device, and/or the at least one operating mode selector can be control technologically connected to, in particular communicate with, a robot controller in safe technology.

The basic safety control device can be configured and/or equipped to be controlled in the basic arrangement by means of the at least one emergency stop trigger means, the at least one enabling device, and/or the at least one operating mode selector.

In such a design, therefore, the basic safety control device is not only configured and/or equipped for controlling the robot when the mobile terminal device is connected mechanically and control technologically with the basic safety control device, but is rather also configured and/or equipped for controlling the robot when the mobile terminal device is away, in particular removed, from the basic safety control device. In such a case, a certain scope of the basic control functions can be controlled via input means that are part of the basic safety control device. These can in particular be the already mentioned emergency stop trigger means, the enabling device and/or the operating mode selector. Other, possibly not secure, input means and/or display means can also be provided on the basic safety control device. These can, for example, be one or more displays, switches, keys, in particular for menu control and to initiate a touch up function, and/or start/stop keys.

The first handheld operation unit part and/or the second handheld operation unit part can form the adapter device; the first handheld operation unit part and/or the second handheld operation unit part can in particular comprise the adjustable holding element. In this way, for example, the at least one first handheld operation unit part can comprise a first holding element and the at least one second handheld operation unit part can comprise a second holding element, whereby the at least two handheld operation unit parts, or the at least two holding elements are configured to be adjustable relative to one another. An adjustment device, which connects the two handheld operation unit parts, or the two holding elements, can be provided. Each holding element can customized to a specific mobile terminal device.

The adapter device can comprise at least one elastically deformable element, which is configured to connect the mobile terminal device to the basic safety control device under elastic pretension.

In such an elastically deformable variant, a frame made of an elastic material for example, can be provided. Such a pliable frame can exhibit a profile that is adapted to the edge of the mobile terminal device, which is for example cut to a length corresponding to the perimeter of the operating device, and is tensioned, for example locked with a U-lock, around the operating device. The inner side of the profile can comprise a resilient soft groove, by means of which any desired mobile terminal devices can be accommodated. The outer side of the elastic frame can be configured for mounting separate operating elements. For this purpose, a specific profile shape, which has a hard but flexible core, can be used. In addition to a malleable reinforcing plate, the stability of the soft frame looping around the mobile terminal device can be ensured by two cords, which are connected via a lock. The operating elements and ports on the mobile terminal device, in particular on a tablet computer, can be made accessible by the configuration of openings at corresponding locations on the frame. The profile can additionally comprise a cable duct. One or more, possibly necessary ventilation openings can also be provided distributed along the entire length on the profile. Depending on the thickness and elasticity of the profile, a protection against falls can inherently be provided as well.

Sometimes the advantage of such a solution is that the entire frame can very easily be constructed from one workpiece.

The adapter device can comprise at least one exchangeable holding element, in particular a frame-shaped exchangeable holding element, which encloses at least one edge section of the mobile terminal device in a form-locking and/or force-locking manner and comprises at least one fastening means, which releasably connects the exchangeable holding element to the basic safety control device. The holding element can in particular have a rigid design.

In the case of a frame-shaped holding element, the frame-shaped holding element can comprise an inner cutout that is adapted to the contour of a respective mobile terminal device. The outer periphery of the frame-shaped holding element can be adapted to the basic safety control device; it can in particular be fitted into a correspondingly shaped accommodation of the basic safety control device.

In an alternative embodiment, the adapter device can comprise a multi-part frame, constructed of individual struts, in particular straight individual struts, and corner connectors connecting the individual struts. In the case of a rectangular or square adapter device, two individual struts disposed at a horizontal distance from one another and two individual struts disposed at a vertical distance from one another can be provided, whereby in each case the respective ends of two adjacent individual struts meeting at one corner are mechanically connected by means of a corner connector. Since the adapter device can selectively be constructed of individual struts of different lengths, adapter devices of different sizes can be provided, so that the most different types and/or sizes of mobile terminal devices can be held in the adapter device.

At least one of the individual struts can be configured as a rail, to which a spacer, which encloses an edge section of the mobile terminal device in a form-locking and/or force-locking manner, is adjustably mounted along the longitudinal extension of the rail, or at least one of the individual struts can comprise multiple mounting locations disposed at intervals, in particular equidistant from one another, along the longitudinal extension of the individual strut, whereby a spacer, which encloses an edge section of the mobile terminal device in a form-locking and/or force-locking manner, is mounted to at least one of these mounting locations. In this respect, the spacer constitutes an exemplary design variant of an exchangeable holding element. The use of the spacer additionally provides room between the operating device and the frame, by means of which operating elements that may be located on the edge of the operating device, such as keys and interfaces, remain accessible despite the frame.

To adapt the adapter device to the respective mobile terminal element, the frame made of the individual struts or rails and corner connectors can alternatively or in addition to a range of different lengths of individual struts selectively be provided with a variety of spacers, in particular differently sized spacers, so as to be able to accommodate a correspondingly larger or smaller mobile terminal device. The same spacers can possibly even be used for different mobile terminal devices, whereby these are, however, mounted at different mounting locations of the rails of the adapter device depending on the specific mobile terminal device. In this way, for example, one size of an adapter device can be used for a variety of device types or models of at least approximately similarly sized mobile terminal devices from different manufacturers, and the spacers can be offset on the rails by means of the different mounting locations, so as to, for example, be able to flexibly customize the adapter device to differently positioned keys and/or switches present in the edge area of the mobile terminal devices.

The basic safety control device can be mounted on at least one of the individual struts, corner connectors, and/or rails, in particular in a manually removable manner.

The basic safety control device can be completely contained in a single housing and this single housing can be mounted, in particular in a manually removable manner, on one of the individual struts, corner connectors and/or rails. Alternatively, multiple components of the basic safety control device can be distributed over multiple housings, and these multiple housings can each individually be mounted on one of the individual struts, corner connectors and/or the rails, in particular in a manually removable manner. For example, the emergency stop trigger means can be accommodated in a separate housing, the enabling device can be accommodated in a separate housing, and/or the operating mode selector can be accommodated in a separate housing.

The basic safety control device can therefore comprise multiple control components accommodated in separate housings, in particular the at least one emergency stop trigger means, the at least one enabling device, and/or the at least one operating mode selector can each be accommodated in a separate housing, and at least one of the multiple housings can be mounted on at least one of the individual struts, corner connectors, and/or rails, in particular in a manually removable manner.

In all embodiments the mobile terminal device can comprise a program-controlled electronic data processor, a touch display and a program stored on the electronic data processor, which is configured to compile robot programs and/or to control a robot, in particular to move a robot arm, and which can be operated via the touch display.

Depending on the embodiment, the inventive handheld robot operation unit can offer one or more of the following advantages.

The handheld robot operation unit can be a portable and/or compact unit that is easy to connect and transport. Larger and unwieldy components, such as safety switches, handles and protective devices, remain in place in the form of the described basic safety control device, i.e. near the robot, and are generally not taken anywhere else. By means of the handheld robot operation unit, the capability, display quality and/or ease of operation of the most up-to-date mobile terminal devices, such as tablet computers, can be used to control a robot.

Integration and connection capabilities for multiple models and design series of tablets from a variety of manufacturers can be provided. Newly available models can be integrated quickly with little effort and used. User preferences and user requirements on the hardware and software can be taken into consideration with the individual selection of the mobile terminal device. The user of the robot has the benefit of the continuous advancement of mobile terminal devices, in particular of tablet computers and their capabilities. A new device can easily be integrated; this can be done with a minimum amount of effort and at low cost. Different users can selectively and easily connect their different mobile terminal devices, in particular tablet computers, mechanically and control technologically to the same robot. From among a large spectrum of mobile terminal devices, such as tablet computers, the user can seek out which performance and price range is the most useful for him. Even a combination can be possible. Simple mobile terminal devices or tablet computers can be provided for maintenance and service employees and high-performance mobile terminal devices or tablet computers can, for example, be provided for application developers or testers.

In this respect, the basic safety control device can constitute a base operating device at the robot. It can offer basic functionality at the robot, primarily in terms of safety functionality. The basic safety control device alone can be constructed in a cost-effective and standardized manner. It remains at the robot or near the robot. One basic safety control device per robot can be provided. It can be equipped to comprise only simple mechanical and electrical coupling options, whereby the basic safety control device does not have to be modified or updated, because only the mobile terminal device has to be exchanged or replaced if advanced new features are to be comprised. The basic safety control device can be configured to be visually appealing and as an adequate unit, in other words operational even without a mobile terminal device, at least in basic functions. The basic safety control device can comprise ergonomic and/or protective functionalities for the mobile terminal device, in particular the tablet computer. If necessary, it can be modified in its shape and/or size, so it can be coupled to different mobile terminal devices, in particular tablet computers.

The invention is explained further in the following, sometimes expressed differently, whereby other terms in the sense of the inventive components are used as well.

In general, at least a mechanical connection is provided between the base operating device, i.e. the basic safety control device, and the mobile terminal device. For its part, the basic safety control device is generally control technologically connected with a robot controller in such a way that, by actuating the basic safety control device, the robot controller is controlled to move the robot arm in a controlled manner. A control technological connection between the robot controller, the base operating device and the mobile terminal device, such as the tablet computer, can be an electrical connection. The base operating device can securely communicate with the robot controller either by wire or wirelessly. In addition, the mobile terminal device, such as the tablet computer, can be tethered wirelessly directly to the robot controller or coupled electrically to the base operating device, and can thus utilize the existing communication of the base operating device to the robot controller. The commands or signals, which are transmitted to the robot controller via the mobile terminal device, such as the tablet computer, can be transmitted in safe technology or non-safe technology. The base operating device with its safety-related operating functionalities, such as emergency off or enabling switches, however, must be securely connected to the robot controller. A wireless interface of the mobile terminal device, such as the tablet computer, can also be used at a work station away from the robot for wireless communication with an external keyboard, mouse and/or an external monitor, for example.

Therefore, depending on the embodiment, the invention can connect the two worlds of safe, reliable industrial control and advanced, user-friendly and high-performance consumer electronics, and thus provide new paths for the efficient and simple operation and control of robots.

This invention describes the basic concept as well as exemplary embodiments of a temporary coupling of a mobile terminal device with safety-related robot-specific and/or system-specific basic operating elements, which are mounted on a base operating device, i.e. a basic safety control device, in particular on a carrier system belonging to the basic safety control device.

By means of the technical solution of a mechanical and control technological coupling, by tethering a mobile terminal device, such as a tablet computer, to a robot controller to control a robot, two types of devices can accordingly be provided, which can be combined to three operating scenarios.

The first operating scenario is provided alone by the base operating device, or alone by the autonomously functional basic safety control device. In a standard state on the robot, the base operating device is visible in direct proximity to the robot, i.e. on the robot cell, so that the emergency off functionality, for example, is easily identifiable and reachable.

A second operating scenario provides for the robot-independent use of the mobile terminal device, for example the tablet computer. The mobile terminal device can be used at a work station away from the robot or moving around, for example to analyze data or to prepare, compile, or edit robot programs or test them offline. The mobile terminal device can either be managed without the inventive adapter device or it can be managed with the inventive adapter device, if the adapter device remains mounted to the mobile terminal device, even though it is separated from the basic safety control device.

The third operating scenario makes provision for an expanded robot operation. In this case, the mobile terminal device is mechanically and control technologically connected with the base operating device, i.e. the basic safety control device. In this configuration, the robot can, for example, be intuitively controlled and programmed with very extensive functionality by means of user-specific graphic surfaces of the touchscreen.

The two components, i.e. the base operating device and the mobile terminal device, can essentially be regarded and developed as two self-contained devices. They can be adapted to one another via a mechanical, and in particular also control technological and/or electrical, interface.

The base operating device, i.e. the basic safety control device, can stay control technologically connected with the robot controller and can also remain physically in proximity to the robot, the robot cell or robot system. The base operating device, i.e. the basic safety control device, can be connected with the robot controller either by wire or wirelessly, in each case with safe technology, in particular in accordance with EN ISO 10218-1. Removal of this base operating device, or the basic safety control device, from the configured environment of the robot controller, results in an emergency stop of the robot, the robot cell and/or the robot system, unless the device is safely logged out by means of an appropriate procedure first. Next to the essential basic operating elements such as emergency off, enabling switches and program start, the base operating device can also comprise additional basic functionalities. These can comprise a key for the touch-up function for teaching the robot, a particularly small display for displaying status reports, menu items or options, a key to click through a simple menu, a key to confirm a selection, e.g. of a manual operation in revolute coordinates, of a to be activated joint axis of the robot arm, of a program selection, of a confirmation of start and/or stop. A selection can also be made by means of a combination rotary/push button switch. To display a status, an optical indicating means, such as a lamp, e.g. an LED, a light ring and/or a light strip, can be provided. In addition to operating elements, sensors, for example acceleration sensors, magnetic field sensors or optical sensors, can be mechanically or electrically connected with the adapter device as well.

The objective here is not to equip the base operating device with as large a scope of functionality as possible, but rather to ensure an easy and intuitive basic operation in a simple and cost-effective manner. On the other hand, however, the customizable and freely expandable functionality of the mobile terminal device is very high; e.g. in the case of a tablet computer, the user interface. And, if sophisticated programming, installation or service work has to be carried out, for example, its temporary value for the user at the robot is very high.

Depending on the design of the base operating device, or the basic safety control device, and depending on the adaptability to the base operating device, the mobile terminal device, in particular the tablet computer, in an original state can correspondingly be mounted directly to the base operating device, or the basic safety control device, or mechanically connected with the base operating device, or the basic safety control device, via the inventive adapter device. This adapter device is customized specifically to the respective model of the mobile terminal device, in particular the tablet computer.

In short, the inventive handheld robot operation unit provides entirely new ways to cost-effectively and safely utilize the fast-paced technological advances in the development of mobile terminal devices for the operation of robots, in particular industrial robots, and be able to realize novel and intuitive approaches in programming. To do this, a system can be provided, which can be constructed from the simplest elements and modules in such a way that it is universally useable, independent of individual models of a mobile terminal device, and can nonetheless easily be customized to the respective application. Its quasi unlimited transformability and expandability is the basis for the high flexibility and versatility of this system for the expansion of universal input devices by means of safe/secure operating elements.

BRIEF DESCRIPTION OF THE DRAWINGS

A number of specific design examples of the invention are explained in more detail in the following description with reference to the attached figures. Independently of the specific context in which they are mentioned, specific features of these exemplary embodiments can, where appropriate also viewed individually or in further combinations, represent general features of the invention.

DETAILED DESCRIPTION

Figure 1:
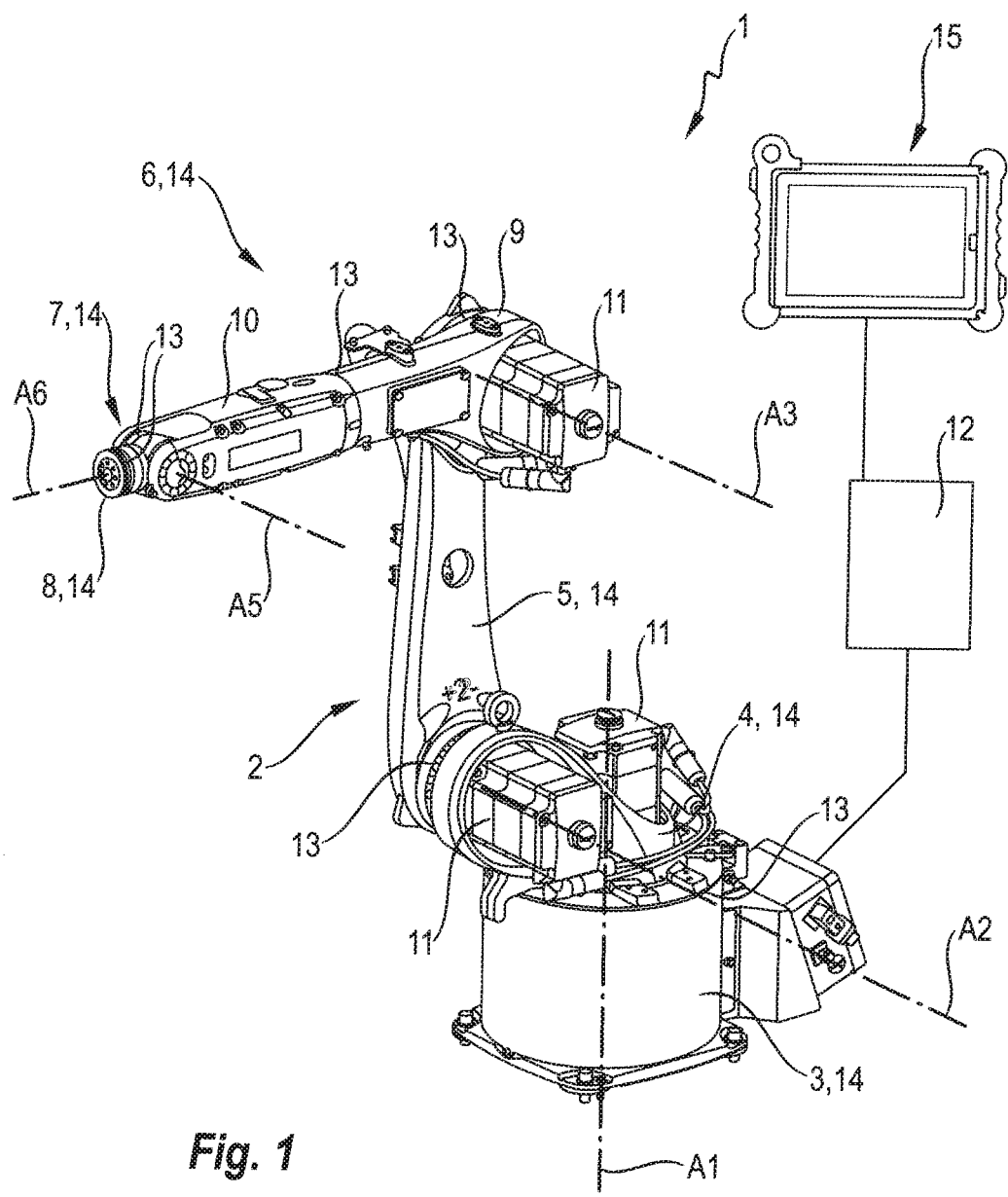
FIG. 1 a schematic representation of a robot including a robot arm and a robot controller, as well as an inventive handheld robot operation unit, FIG. 2 a first embodiment of a handheld robot operation unit with an adapter device in the form of a rigid frame, FIG. 3 a second embodiment of a handheld robot operation unit with a pluggable adapter device, FIG. 4 a third embodiment of a handheld robot operation unit with an adapter device that can be disassembled or collapsed, FIGS. 5-11 various embodiments of a handheld robot operation unit with an adapter device, which comprises two oppositely adjustable handheld operation unit parts, FIGS. 12-16 various embodiments of a handheld robot operation unit with an adapter device, which comprises two oppositely adjustable spring-pretensioned handheld operation unit parts, FIGS. 17-24 various embodiments of a handheld robot operation unit with an adapter device, which comprises elastic components, FIG. 25 a fourth embodiment of a handheld robot operation unit with an adapter device, which comprises struts, and FIGS. 26-30 a fifth embodiment of a handheld robot operation unit with an adapter device, which comprises displaceable, adjustable and/or exchangeable spacers.

FIG. 1 shows a robot 1, which comprises a robot arm 2 and robot controller 12. In the case of the present design example, the robot arm 2 comprises multiple links 14, which are disposed in succession and connected by means of joints 13. The links 14 are in particular a rack 3 and a carousel 4, which is rotatably mounted around a vertically extending axis A1 relative to the rack 3. In the case of the present design example, further links of the robot arm 2 are a link arm 5, an arm jib 6 and a preferably multi-axial robot hand 7 with a mounting device designed as a flange 8 for mounting an end effector that is not depicted in more detail. The link arm 5 is mounted at the lower end e.g. on a link arm bearing head on the carousel 4 that is not depicted in more detail, so as to be pivotable about a preferably horizontal axis of rotation A2. At the upper end of the link arm 5, the arm jib 6 is in turn mounted so as to be pivotable about a likewise preferably horizontal axis A3. On its end, the arm jib carries the robot hand 7 with its preferably three axes of rotation A4, A5, A6.

In the case of the present design example, the arm jib 6 comprises an arm housing 9, which is pivotably mounted on the link arm 5. A primary hand housing 10 of the arm jib 6 is mounted on the arm housing 9 so as to be rotatable about the axis A4.

The robot arm 2 is movable in its three main axes by means of three electric drive motors 11 and in its three hand axes by means of three additional electric drive motors 11.

The robot controller 12 of the robot 1 is configured, or equipped, to execute a robot program, by means of which the joints 14 of the robot arm 2 can be adjusted or rotated in an automated manner or automatically in a manual operation in accordance with the robot program. For this purpose, the robot controller 12 is connected with the controllable electric drive motors 11, which are configured, to adjust the joints 14 of the robot arm 2. An inventive handheld robot operation unit 15 mechanical control is connected with the robot controller 12.

Figure 2:
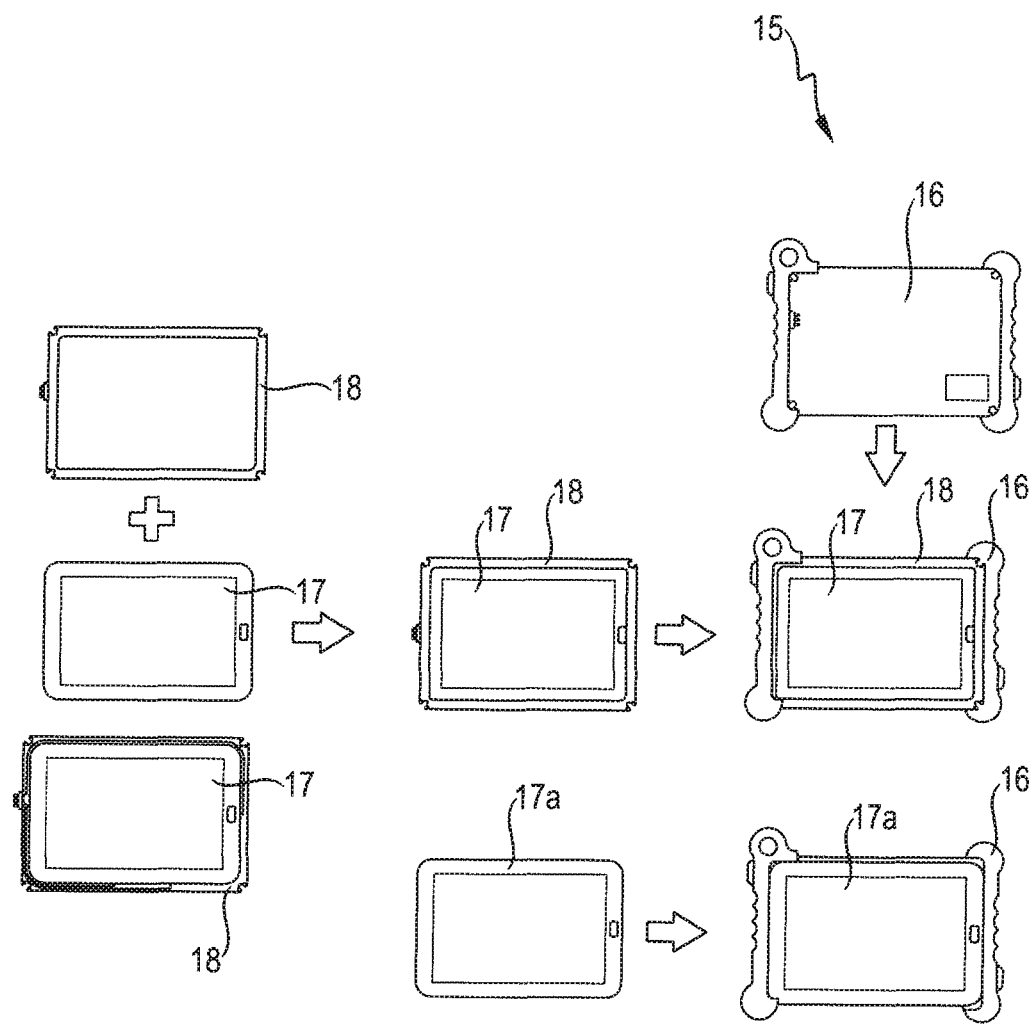

FIG. 2 shows the structure of a first embodiment of a handheld robot operation unit 15, which comprises a basic safety control device 16, a mobile terminal device 17 and a holder, which is configured to mount the mobile terminal device 17 on the basic safety control device 16. The holder forms an adapter device 18, which is configured to mechanically and/or electrically connect the mobile terminal device 17 to the basic safety control device 16. Among other things, the adapter device 18 has the function of ensuring a defined and uniform electrical and/or mechanical interface that is independent of the design of the tablet.

Instead of a larger mobile terminal device 17a that could be directly inserted into the basic safety control device 16, the adapter device 18 makes it possible to also integrate a smaller mobile terminal device 17 into the basic safety control device 16, by equipping the smaller mobile terminal device 17, as shown, with the adapter device 18, so that the smaller mobile terminal device 17 and the adapter device 18 can together be inserted into the basic safety control device 16 with a custom-fit. In such an embodiment, the mobile terminal device 17, especially as a tablet computer with its large captivating touchscreen, is dominant and relevant for the visual effect. Aside from this, though, the basic safety control device 16 can be used on its own. In this first embodiment the adapter device 18 is configured as an adapter frame.

Figure 3:
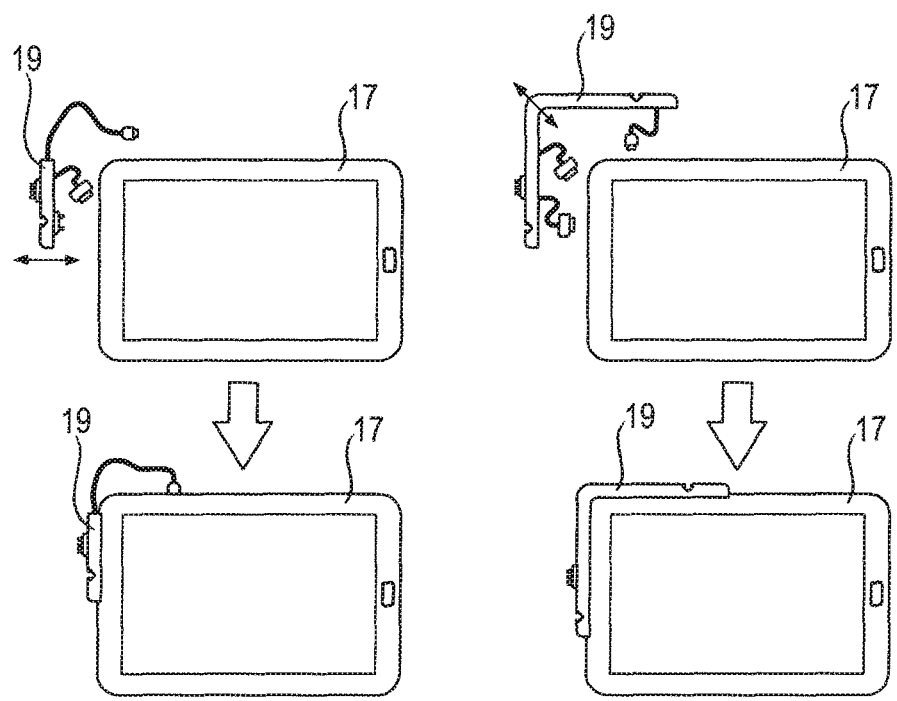

Two exemplary variants are shown in FIG. 3, in which the adapter device 18 is configured not as an adapter frame, but rather as rod-shaped or angular adapter extension pieces 19. The option of an electrical adaptation is suggested as well.

Figure 4:
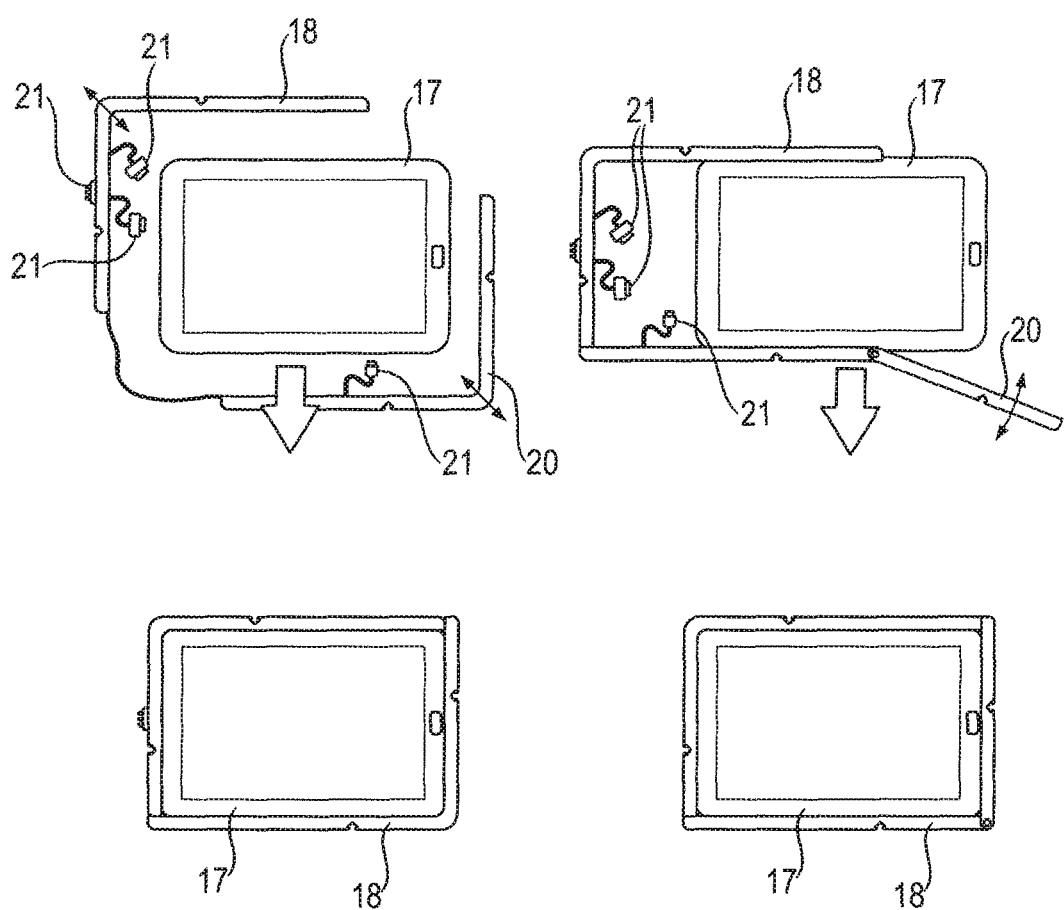

FIG. 4 shows the structure of a third embodiment of a handheld robot operation unit 15. This adapter device 18 comprises at least one adjustable holding element 20, which is configured in a closed position of the adjustable holding element 20, as shown in the lower depictions of FIG. 4, to enclose the mobile terminal device 17, so that together with the adapter device 18 it can be connected with the basic safety control device 16 (FIG. 2) in a form-locking and/or force-locking manner, and in an open position of the adjustable holding element 20, as shown in the upper depictions of FIG. 4, to mechanically release the mobile terminal device 17 to separate it from the basic safety control device 16 (FIG. 2), so that it can be removed from the adapter device 18. The adapter device 18 can have corresponding compatible electrical connecting plugs 21.

The function of such an intermediate or adapter frame is to provide a unique and safe mechanical, and if necessary electrical, interface between the base operating device, i.e. the basic safety control device 16 and the mobile terminal device 17, in particular the tablet computer. The underlying problem is that the positions of the ports can be different depending on the model. In the case of an electrical interface, wires from external tablet ports, such as USB, network, power, FireWire, etc., for example, could be led in such a slim frame and bundled in a single proprietary interface. Mechanical coupling can occur via one or also multiple interfaces that are favorably distributed on the intermediate frame. The adapter frame could also comprise a protective functionality, if it has shock-absorbing, cushioning or scratch-proof surfaces or structural elements, for example, and encloses vulnerable areas of the mobile terminal device 17.

Since the adapter frame in this embodiment is fixedly connected with the mobile terminal device 17 and is not intended to be quickly removed and reattached during use, the use of a very slim and lightweight design, which is oriented on the shape and size of the original mobile terminal device 17 and does not substantially change it, is crucial. This maintains the manageability and mobility, as well as the familiar feel of the mobile terminal device 17.

With respect to handling, the focus of a classic mobile terminal device 17, such as a tablet computer, is primarily on mobility and less on ergonomics. When programming and operating robots for extended periods of time, however, ergonomics is a deciding factor for comfortable and fatigue-free work, and essentially concerns the grasping, carrying and holding of the expanded handheld robot operation unit 15 as well as the accessibility and operability of keys and switches. Due to the size of common ergonomic elements, such as handle forms, these are not provided on the slim adapter frame, but rather on the base operating device, i.e. the basic safety control device 16.

An adapter frame can have different characteristic forms depending on the requirement, coupling principle, universality and functionality. All adapter frame elements can comprise openings or special form elements so that underlying tablet operating keys or ports can continue to be used.

In the first embodiment according to FIG. 2, many surfaces and elements of the basic safety control device 16 do not have functions if it is used alone without a mobile terminal device 17. These areas provide the impression of an empty frame rather than the impression of a high-quality and well-thought-out base operating device.

Figure 5:
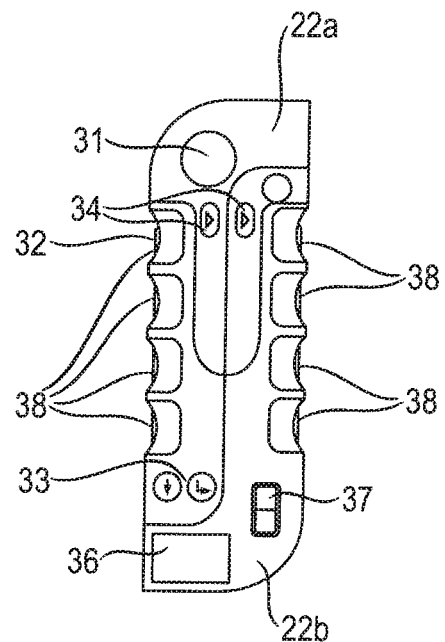

In the schematic representation of the basic safety control device 16 in accordance with FIG. 5 to FIG. 8, functional elements, which are needed only for coupling the mobile terminal device 17, are covered in individual operation of the basic safety control device 16 by adjusting at least two handheld operation unit parts 22a, 22b, and the shape of the basic safety control device 16 remaining at the robot 1 is thus changed in such a way that it appears as a self-contained shape-modified unit, as is shown in FIG. 5.

Figure 6:
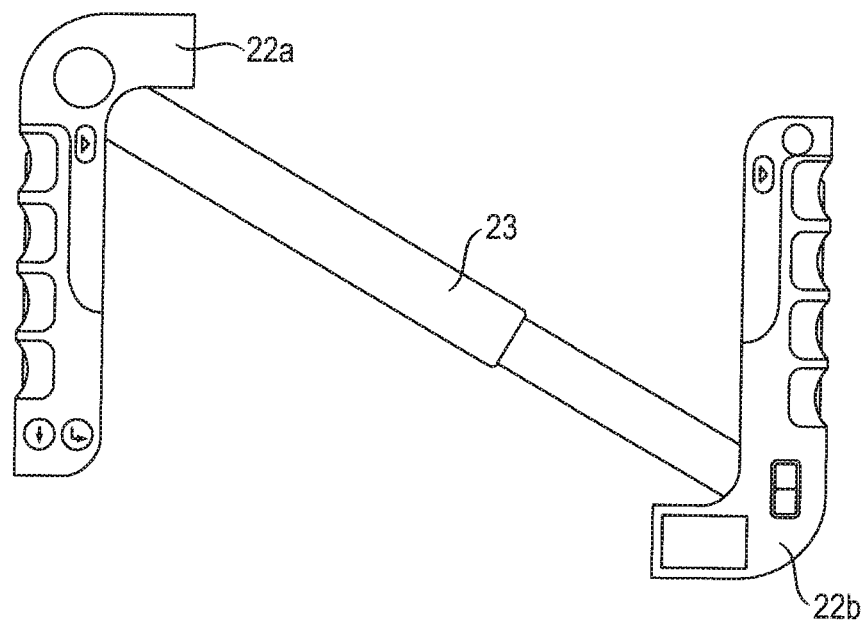
Figure 7:
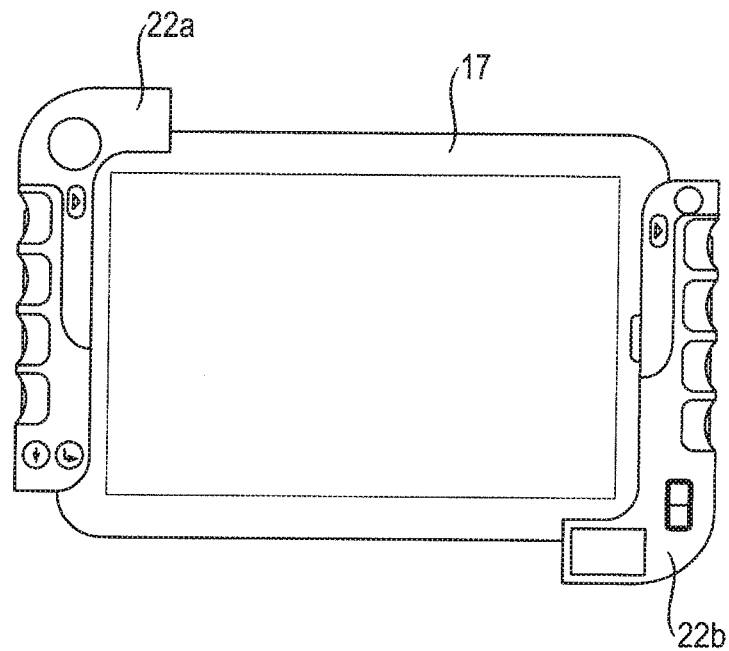
Figure 8:
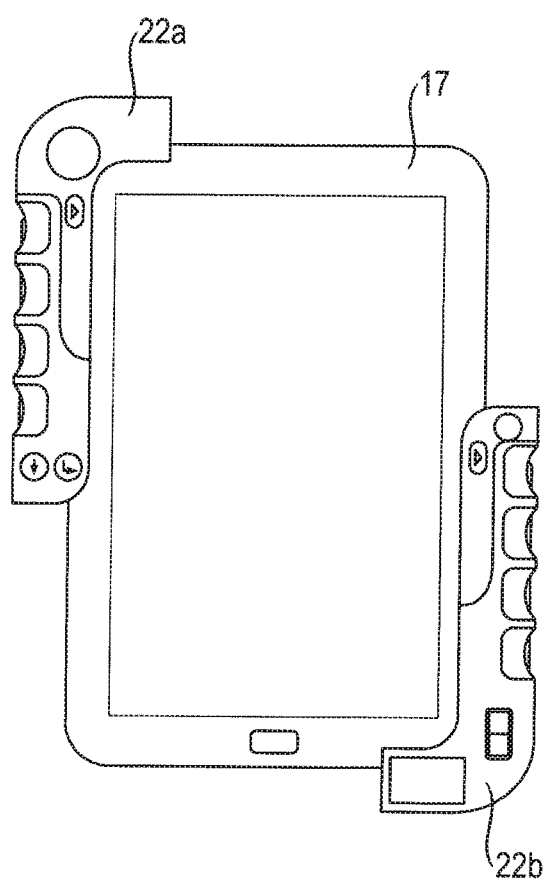

In this embodiment, the basic safety control device 16 comprises a first handheld operation unit part 22a and at least one, relative to the first handheld operation unit part 22a adjustable, second handheld operation unit part 22b, whereby the handheld operation unit parts 22a, 22b are adjustably coupled to one another, for example by means of a length-adjustable coupling rod 23, in such a way that the handheld operation unit parts 22a, 22b in a basic arrangement according to FIG. 5 form a contour-reduced handheld robot operation unit 15, and in a contour-expanded accommodation arrangement according to FIG. 6 to FIG. 8, in which the second handheld operation unit part 22b is offset from the basic arrangement according to FIG. 5 relative to the first handheld operation unit part 22a, the handheld robot operation unit 15 is configured to accommodate the mobile terminal device 17 by means of the adapter device, which in this embodiment comprises the two handheld operation unit parts 22a, 22b and length-adjustable coupling rod 23.

As is shown in particular by FIG. 5, the basic safety control device 16, in particular the handheld operation unit parts 22a, 22b, can comprise the following operating elements. A emergency stop trigger means 31, an enabling device 32, an operating mode selector 33, start keys 34, keys 35 to click through menu items, a simple electronic display 36, a plus-minus-key 37, for example for manual single-axis control.

Ergonomic recessed grips 38 for the fingers of one hand of a user allow comfortable and fatigue-free holding of the handheld robot operation unit 15, both in the contour-reduced arrangement according to FIG. 5, as well as in the contour-expanded arrangement according to FIG. 6 to FIG. 8.

For simple partially guided relative movement of the two handheld operation unit parts 22a, 22b, the length-adjustable coupling rod 23 can comprise a prismatic joint as per FIG. 9 to FIG. 11. This can be embodied as a linear guide or as a telescopic rail, or as pivotable links (FIG. 16), which are connected to the handheld operation unit parts 22a, 22b. The prismatic joint can be designed to be spring reset by means of a spring device 24, so that in the inserted state the mobile terminal device 17 is held between the two sides, for example in a groove with elastically pliable contact elements 40. For easy insertion of the mobile terminal device 17, the prismatic joint can snap into place in its pulled apart condition, as is illustrated in FIG. 11. In this variant, this blocking is automatically reversed upon contact with the mobile terminal device 17, so that the prismatic joint is pulled together in a spring-actuated, cushioned manner and securely accommodates the mobile terminal device 17 between two corners.

Electrical lines, in particular wires can be passed through the inside of the length-adjustable coupling rod 23, in particular the prismatic joint.

In the coupled state, the links of the sliding element can lie behind the mobile terminal device 17 and can likewise with equipped handles, loops or additional keys (not depicted), which allow an ergonomically comfortable carrying and operating of the expanded handheld robot operation unit 15.

The kinematics selected here as an example make the quick adaptability of the basic safety control device 16, or the base operating device, to a variety of basic dimensions and models of the mobile terminal device 17 possible. The accommodation of variously thick mobile terminal devices 17, which can in particular also comprise a variety of edge shapes, is realized by means of exchangeable pliable contact elements 40.

Depending on the structure of the operating software or user preferences, the mobile terminal device 17 can be used in an upright (FIG. 8) or in a sideways (FIG. 7) orientation. The flexible adjustment of the base operating device allows a quick adaptation of the holder to the respective operating orientation.

A special variant of a length-adjustable coupling rod 23 is illustrated in FIG. 9 to FIG. 11. The length-adjustable coupling rod 23 is provided with a spring device 24, which in the contour-expanded accommodation arrangement according to FIG. 10 is configured to store a spring force, so that the length-adjustable coupling rod 23 is automatically moved back into the contour-reduced arrangement according to FIG. 9, when the mobile terminal device 17 is removed. From the contour-reduced arrangement according to FIG. 9, a user can then extend the length-adjustable coupling rod 23 with his hand 25, so that the spring device 24 is again tensioned. To prevent the second handheld operation unit part 22b from inadvertently springing back into the contour-reduced arrangement according to FIG. 9, a locking means 26, for example in the form of a latch pin, can be provided, which in the contour-expanded accommodation arrangement according to FIG. 10 locks two rod parts 23a, 23b of the length-adjustable coupling rod 23, which are adjustable relative to one another, against one another in a form-fitting manner.

Figure 12:
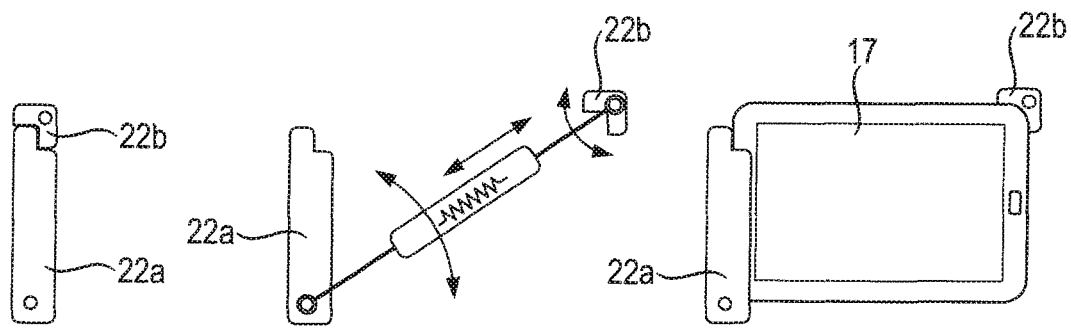
Figure 13:
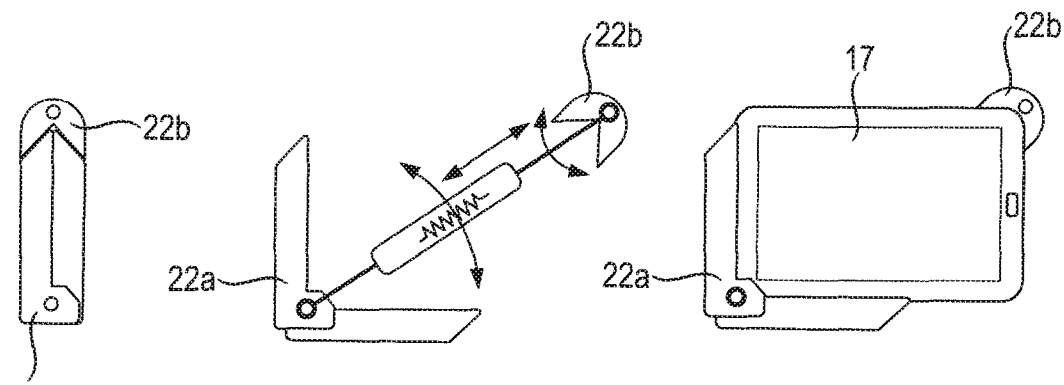
Figure 14:
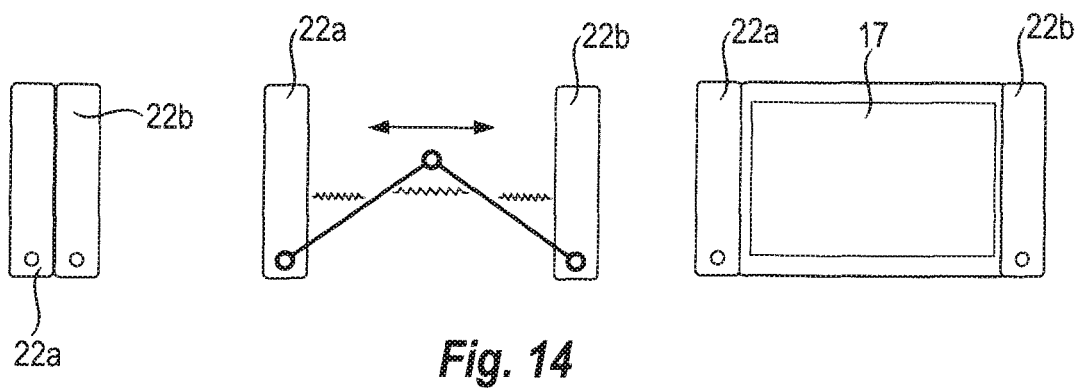
Figure 15:
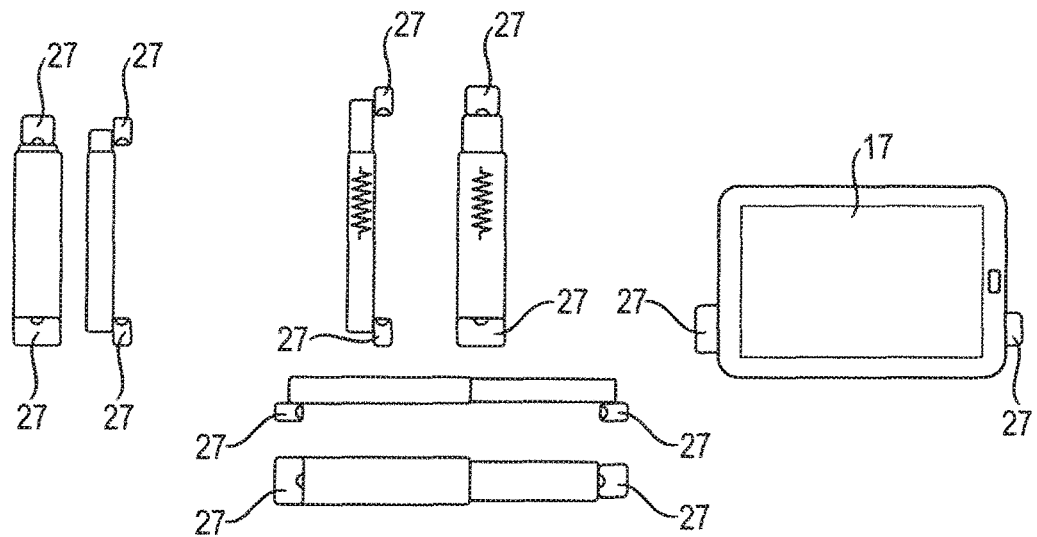

As shown in FIG. 12 to FIG. 14, the two handheld operation unit parts 22a, 22b can comprise different forms, sizes and/or contour shapes, and can be configured to be adjustable relative to one another by means of one coupling rod 23, in particular with a spring device 24. In the contour-reduced arrangements, as shown in the representations respectively on the left side, the basic safety control devices 16 can assume a variety of optical manifestations, and in the contour-expanded accommodation arrangements, as shown in the representations respectively on the right side, the basic safety control devices 16 can enclose the sides of the mobile terminal device 17.

Figure 16:
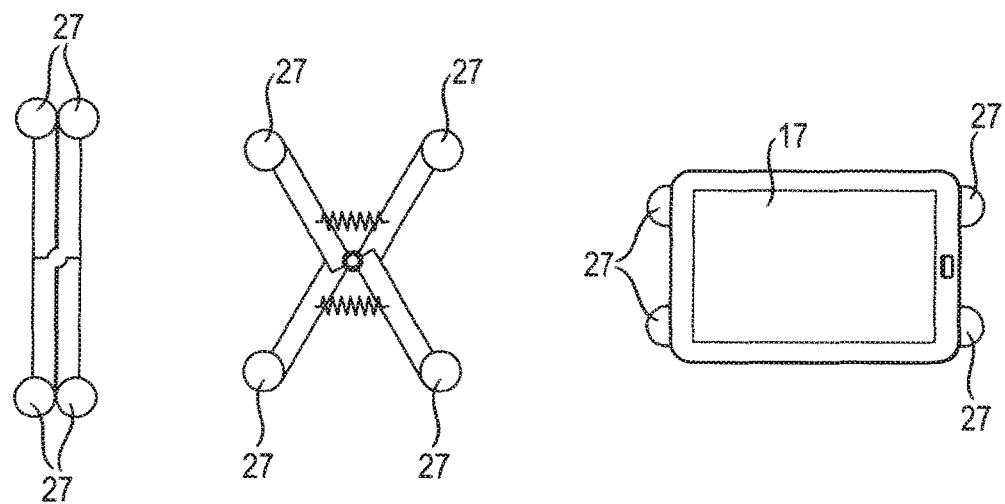
Figure 17:
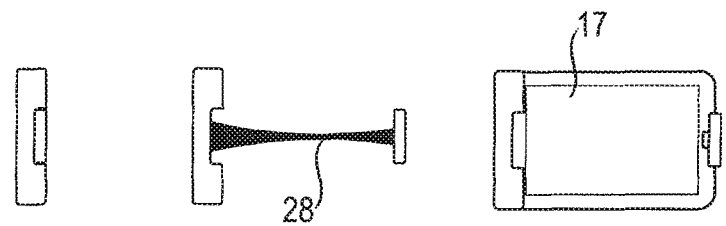
Figure 18:
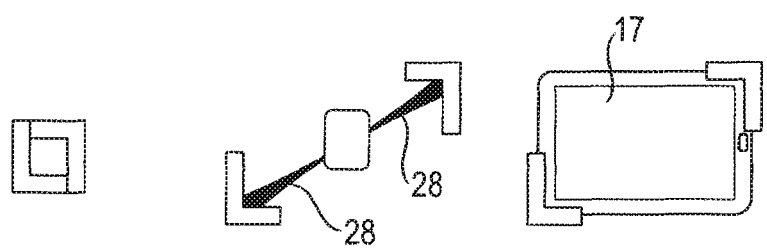
Figure 19:
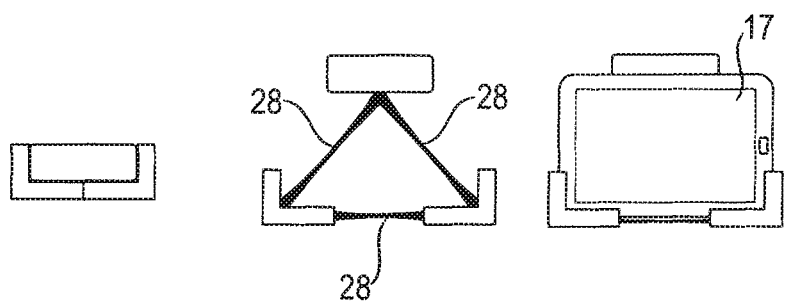

The other embodiments according to FIG. 15 to FIG. 20 show schematically in overviews, how in principal the basic safety control device 16 can be configured to be able to hold a mobile terminal device 17 by means of a wide range of different adapter devices 18. To do so, the basic layout of the basic safety control devices 16, which can consist of either a single base body or multiple carrier segments 27, is essentially differentiated. The carrier segments 27 are movable relative to one another, by being coupled to one another either in an articulated manner, as illustrated in FIG. 16, or in an elastic manner, as illustrated in FIG. 17 to FIG. 20.

The movement can occur in a rotating, sliding, screwing or rolling manner or in a combination of the elementary movements, forcibly guided with a degree of freedom or multi-dimensionally free in the plane, in the space or in the sphere. If elastically deformable elements 28 are used, the basic safety control devices 16 can be configured to be either partially or entirely elastic. In other words, the basic safety control devices 16 can consist of a combination of rigid/unyielding segments/bodies, which are elastically connected to one another, or it can be deformable as a whole, for example by the base body of the basic safety control devices 16 exhibits homogeneous or heterogeneous elastic behavior.

Figure 21:
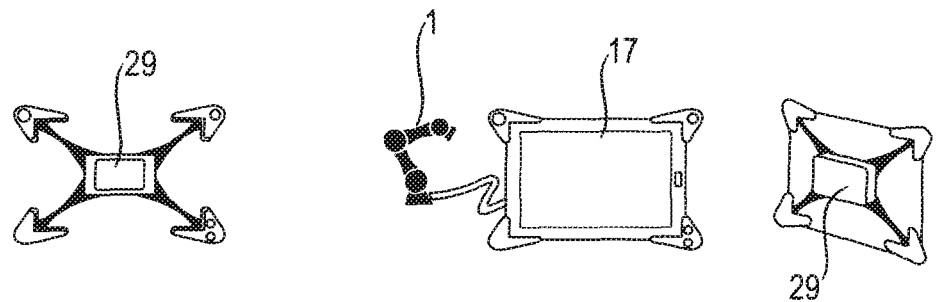
Figure 22:
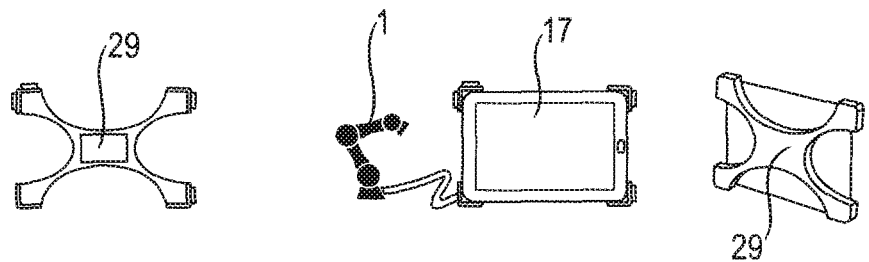

In addition the structure, as schematically shown in FIG. 21 and FIG. 22, can be based on a central middle segment 29, which comprises the basic safety control device 16 and which forms, for example, both the geometric/mechanical and the electrotechnological and control technological center of a star-shaped arrangement. The central middle segments 29, which can be behind the mobile terminal device 17, can also be equipped with hand grip, holding or loop elements, which allow the handheld robot operation unit 15 to be held ergonomically below or near the center of gravity.

Figure 20:
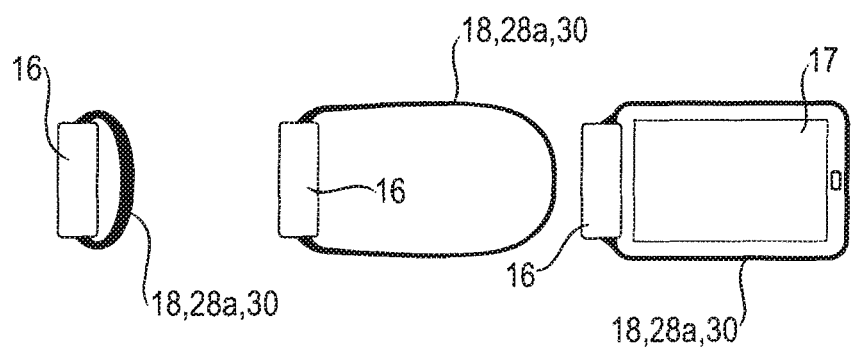

In the case of an elastically deformable element 28 it can, as shown in FIG. 20, comprise a type of ring structure 30 with a decentralized basic safety control device 16. In this embodiment, the adapter device 18 comprises at least one elastically deformable holding element 28a, which is configured to connect the mobile terminal device 17 with the basic safety control device 16 under elastic pretension.

Figure 23:
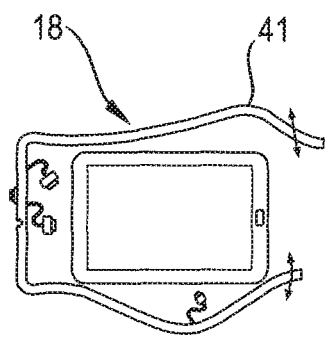
Figure 23:
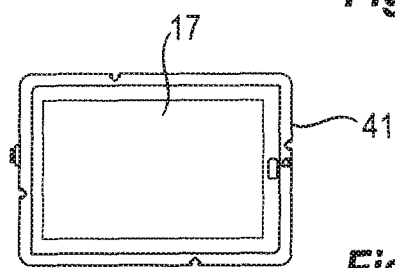

In the design variant of FIG. 23, the adapter device 18 can comprise an elastic frame strip 41. The elastic frame strip 41 can be an elastomer strip and, if necessary, be provided with a wire core. It can be cut corresponding to the dimensions, i.e. the outline, of the respective mobile terminal device 17 around the outer edge of which it is to be laid, and connected at the open ends. The elastic frame strip 41 can comprise a hollow core for guiding one or multiple wires through.

Figure 24:
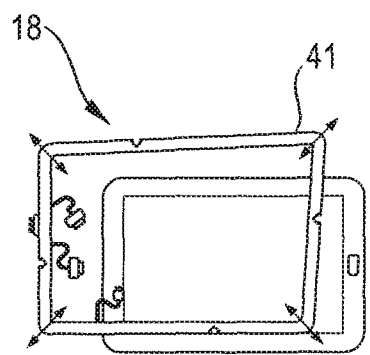
Figure 24:
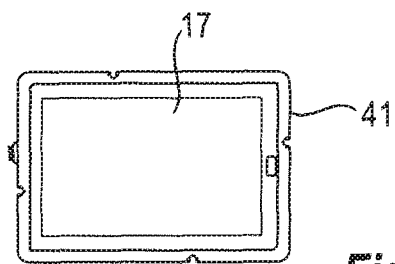

In the design variant of FIG. 24, the adapter device 18 can be an elastic or partially elastic adapter frame. Such a closed structural frame molds itself completely or partially elastically to the contour of the respective mobile terminal device 17; for example, by snapping it into the plastic frame or by pulling on a plastic casing, in particular a silicone casing.

Figure 25:
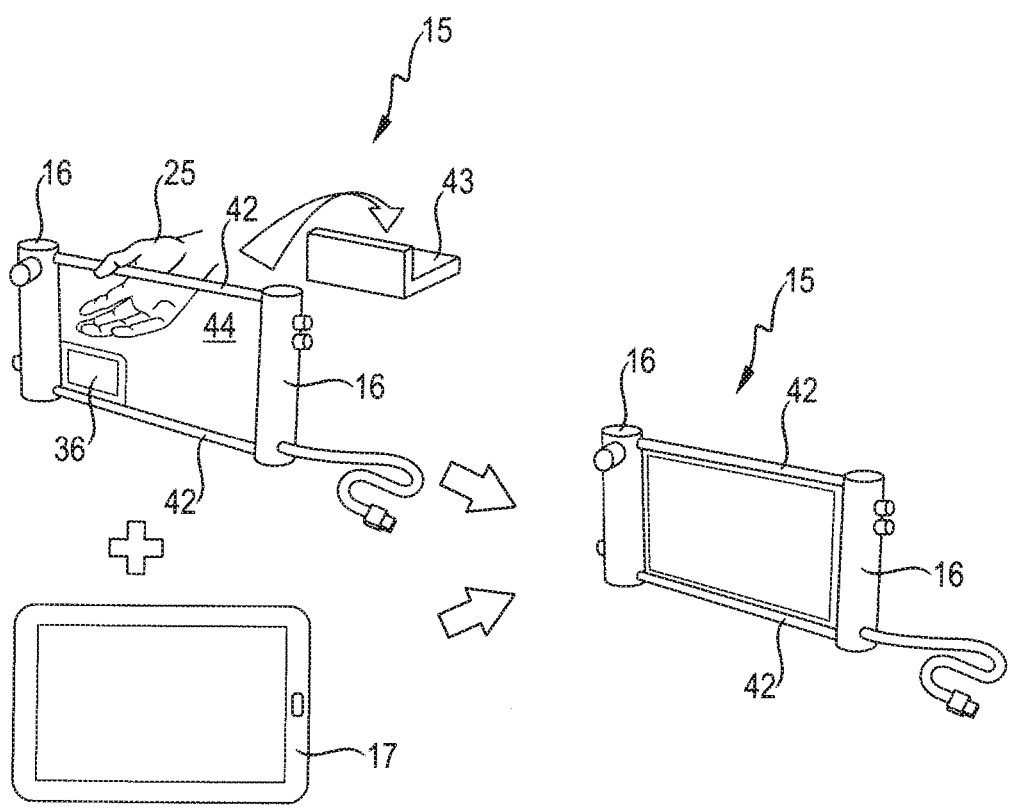
Figure 26:
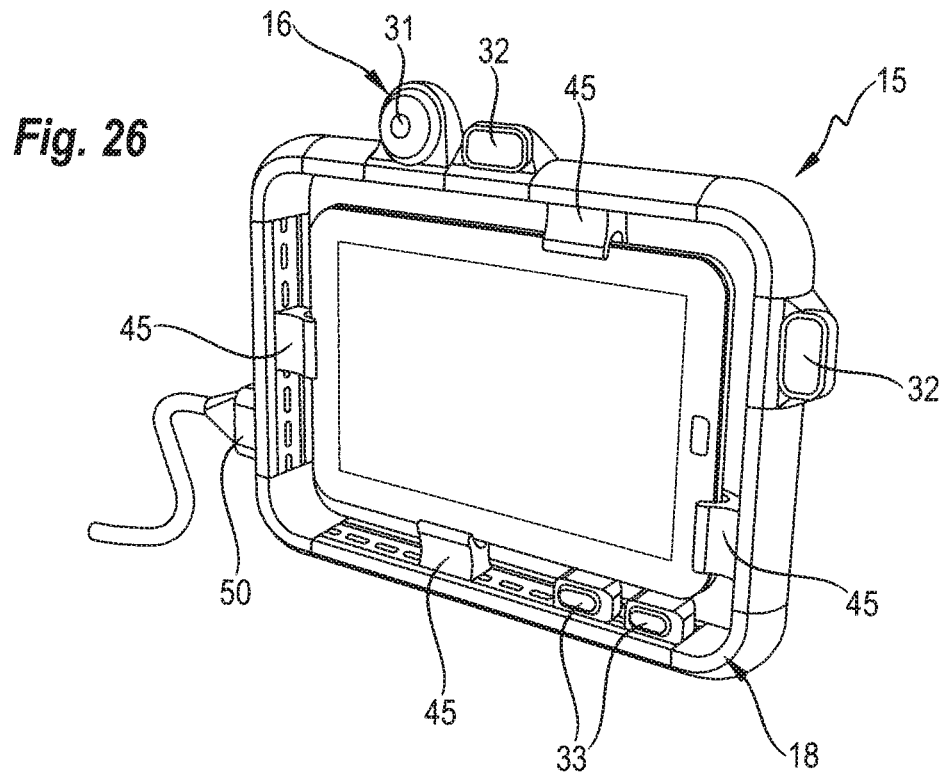

The fourth embodiment of a handheld robot operation unit 15, depicted in FIG. 25, shows struts 42, which, in the expanded condition, provide stability to the base operation device, i.e. two rod-shaped parts of the basic safety control device 16, by mechanically connecting the two rod-shaped parts of the basic safety control device 16 to one another. In individual operation, in other words without the mobile terminal device 17, the struts 42 can have a different function, such as carrying by means of the hand 25 of the user, holding or hanging on a wall bracket 43. The rod-shaped parts of the basic safety control device 16 and the struts 42 can also form a window opening 44, into which the electronic display 36 of the basic safety control device 16 can project.

A fifth embodiment of a handheld robot operation unit 15 with an adapter device 18, which comprises displaceable, adjustable and/or exchangeable spacers 45, is shown in FIG. 26 to FIG. 30.

The adapter device 18 in this fifth embodiment comprises a multi-part frame a multi-part frame, constructed of individual struts 46, in particular straight individual struts 46, and corner connectors 47 connecting the individual struts 46.

Figure 27:
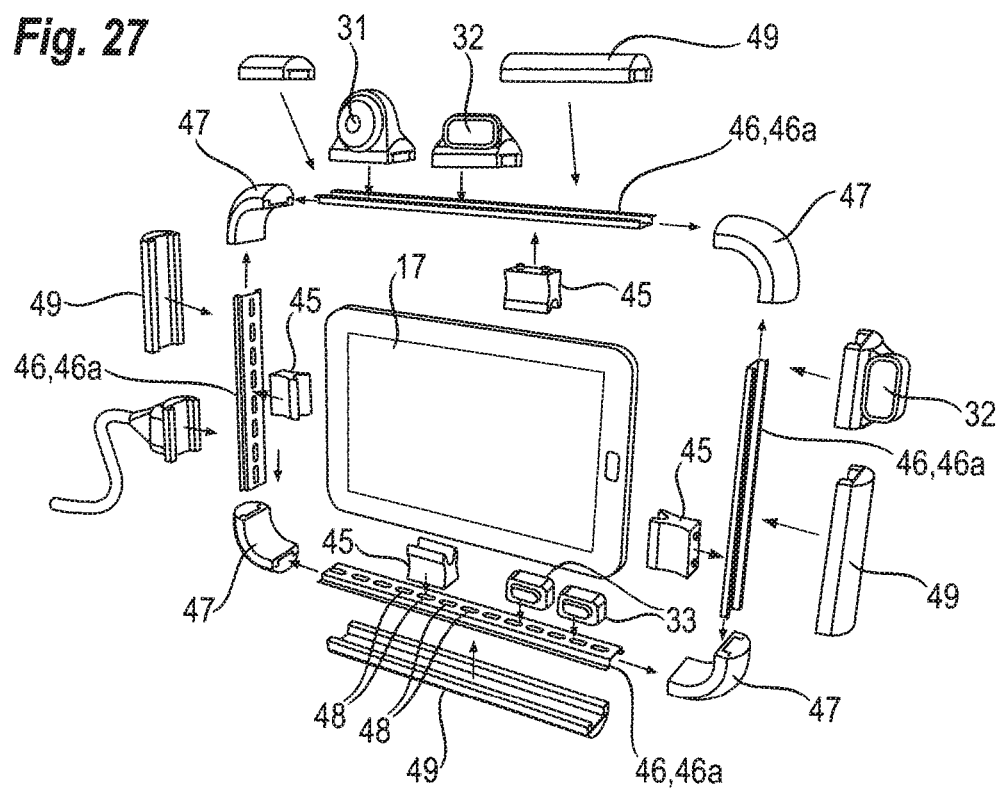
Figure 28:
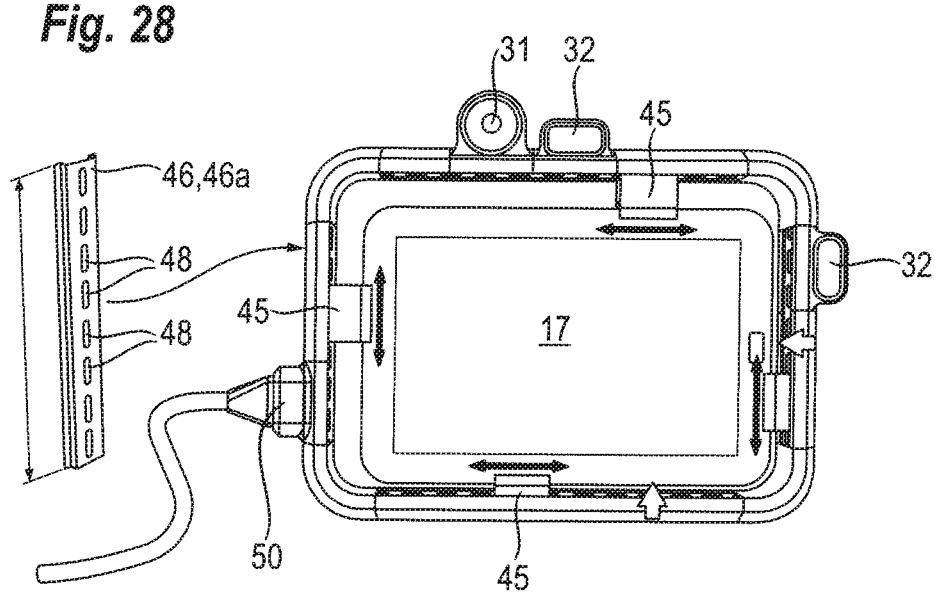

As shown, in particular, by FIG. 27, the individual struts 46 are configured as rails 46a, to which the spacers 45, which enclose an edge section of the mobile terminal device 17 in a form-locking and/or force-locking manner, are adjustably mounted along the longitudinal extension of the rails 46a. The individual struts 46 also comprise multiple mounting locations 48 disposed at intervals, in particular equidistant from one another, along the longitudinal extension of the individual struts 46, whereby the spacers 45, which encloses an edge section of the mobile terminal device 17 in a form-locking and/or force-locking manner, are respectively mounted to one of these mounting locations 48.

The basic safety control device 16 is mounted to at least one of the individual struts 46 or the rails 46a.

The purpose of this fifth embodiment is to make it possible to use consumer electronics type mobile terminal devices 17, in particular tablet computers, for the operation and programming of robots in an industrial setting. The intent is to eliminate the cost of developing operating devices, accelerate adaptation to the respective current state of the art and provide a customizable selection of operating devices, i.e. adapted to the specific application or to the availability of handheld robot operation units 15. The objective, however, is not to be able to use a specific device or a specific design series, but rather the intent of this fifth embodiment is to make a broad, manufacturer-independent, spectrum of mobile terminal devices 17 usable as input devices for operation and programming of robots.

Practically any non-secure mobile terminal device 17, such as a tablet computer for example, can thus be expanded to be a handheld robot operation unit 15 with safe operating elements in the form of a basic safety control device 16. Preferred structural solutions, in particular, are proposed here. The extension is also intended to help increase the industry-suitability of the handheld robot operation unit 15, in particular the therein accommodated mobile terminal device 17, in particular with respect to protection against falls and ergonomics.

A fundamental concept is based on a box of building blocks for a frame system, which can easily and cost-effectively be individually adapted to any, in particular rectangular, mobile terminal device 17. A key challenge is ensuring the accessibility of operating elements and ports, such an on/off switches, USB ports and the like, on the mobile terminal device 17, such as a tablet computer.

The surrounding frame including the individual struts 46 or the rails 46a and the corner connectors 47 does not only assume a protective function for the mobile terminal device 17, as well as holding and handling functions, but with its structure it also offers connection possibilities for robot-specific hardware components, such as emergency stop trigger means 31, enabling devices 32 or operating mode selectors 33. These individual hardware components, such as emergency stop trigger means 31, enabling devices 32 or operating mode selectors 33, can be held in separate housings and, by mounting the separate housings on the individual struts 46 or rails 46a and/or the corner connectors 47, the multiple housing together can form the basic safety control device 16.

The challenge of being able to use a spectrum of different device models that is as broad as possible is easily and economically efficiently realized through the construction as such a building block system. To do this, only simple and cost-effective standard components, which are not customized and limited to the respective device model, are used. In this way, by the combination and arrangement of a few different components, such as the individual struts 46 or the rails 46a and/or the corner connectors 47, many different variants can be constructed, which can quickly be configured specifically for the respective task and application.

Due to its rigid support structure, the frame module can fulfill protective, holding and carrying functions. It is formed at least by the individual struts 46 or the rails 46a and the corner connectors 47. Top-hat rails, which are cost-effective and in particular generally well-known and which, in addition to mechanical stability, also provide a standardized connection interface, can be used as profile carriers, i.e. as the individual struts 46 or the rails 46a. By simply sliding them into one another, the individual struts 46 or the rails 46a snap into the four corner connectors 47 and form a closed frame, on the inner side of which multiple, in particular at least four, spacers 45 are provided.

The spacers 45 can comprise a rigid base body, which ensures a defined distance between the mobile terminal device 17 and the individual struts 46 or the rails 46a, and can thus transmit retention forces. A contact element, which consists of a soft elastomer, can be inserted between each respective spacer 45 and the mobile terminal device 17. Under slight pressure, this contact element conforms to the shape of the edge of the respective mobile terminal device 17 and ensures a defined mechanical connection to the frame, i.e. to the basic safety control device 16.

Depending on the configuration of the spacers 45, they can, for example, also have the function of impact energy absorption in case of a fall, or the accommodation of operating or display elements.

The basic structure of individual struts 46 or rails 46a and corner connectors 47, as well as the spacers 45, correspondingly encloses the mobile terminal device 17. The manufacturer or the user can individually configure the adapter device 18 depending on the task and the application. Operating elements can be attached on the outside and/or on the inside on the individual struts 46 or rails 46a, for example. The standardized profile rail or a slotted hole perforation of the top-hat rail can be used for this purpose. In addition to emergency stop trigger means 31, other keys and/or small auxiliary displays and/or lamps for status indicators can be integrated as well. All the signals and power lines of the handheld robot operation unit 15 can be gathered at one connecting plug 50 and led to the outside in a bundle.

Purely mechanical operating elements can also be added alongside the electrical operating elements. These not depicted elements can, for example, serve to improve the handling of the handheld robot operation unit 15. In this respect, hand grip elements, carrying loops and/or classic handle domes can be configured on such a handheld robot operation unit 15.

Sections of the individual struts 46 or rails 46*a* which remain open can be provided with profile covers 49. These profile covers 49 can, for example, be cut cost-effectively from a long plastic extrusion profile to fit precisely. These profile covers 49 can simply be pushed over the individual struts 46 or rails 46*a* from the top, for example, and/or snap into them. These profile covers 49 can consist of a pliable plastic, which on the one hand allows ergonomically comfortable holding of the frame in the hand 25 and can, on the other hand in case of a fall, provide shock absorption by means of material cushioning. For reasons of ergonomics and design, the profile covers 49 can transition into the shape of the corner connectors 47. The material or the structure of the corner connectors 47 can be selected to both provide strength to the frame, as well as to absorb and dissipate impact energy.

Likewise, it is possible to place electrical input means, such as keys or operating elements, in the grip frame under the profile cover 49 that can be actuated by compressing or pushing the soft material of the respective profile cover 49.

The profile covers 49 can alternatively be provided with a pressure-sensitive surface, with which both cushioning in the event of a fall and actuation of the operating elements can be realized in safe technology.

For aesthetic and haptical reasons, a simple cover on the open individual struts 46 or rails 46*a* can also be provided on the inner side of the frame.

The construction of a building block system can occur as follows. To do this, the mobile end device 17 can first be incorporated into the frame of individual struts 46 or rails 46*a* and corner connectors 47, and expanded in an application-specific manner by means of extension and operating elements. To finish, open profile carrier areas are provided with profile covers 49.

The universality and versatility of the building block system is realized by means of the unrestricted transformability and adaptability of the construction. For the basic structure, the individual struts 46 or the rails 46*a* are cut to length from a strand material. The principal dimensions of the frame are defined via the size of the handheld robot operation unit 15, as well as via the distance between the mobile terminal device 17 and the frame. There is the option of creating a wide gap by means of a wide spacer 45 or allowing the frame to almost rest on the edge of the mobile terminal device 17 by means of a short spacer 45. The spacers 45 can be slid freely and, if necessary, repositioned on the inside of the frame, so that they do not cover any keys or ports of the mobile terminal device 17.

Figure 29:
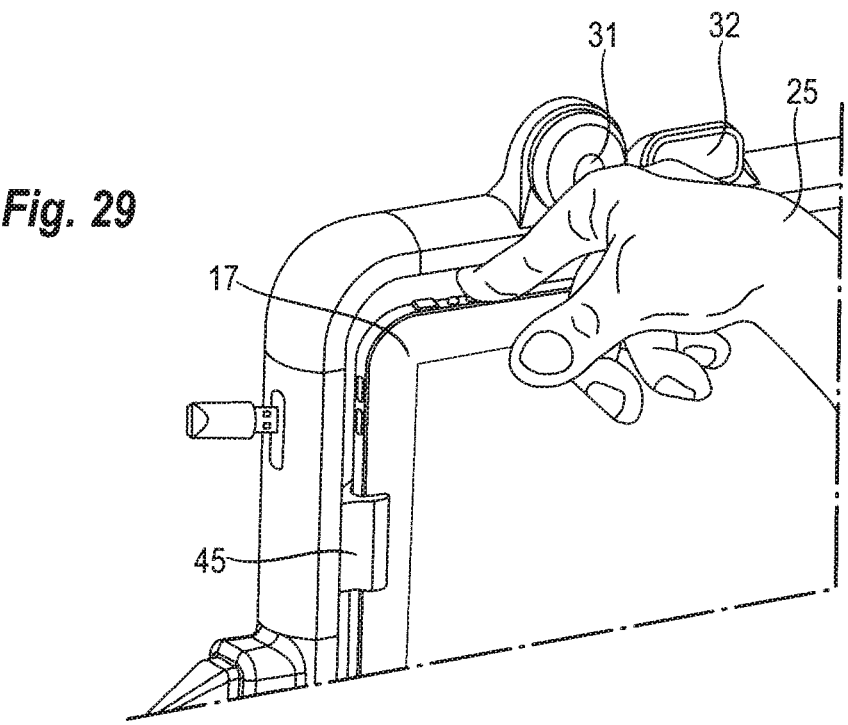
Figure 30:
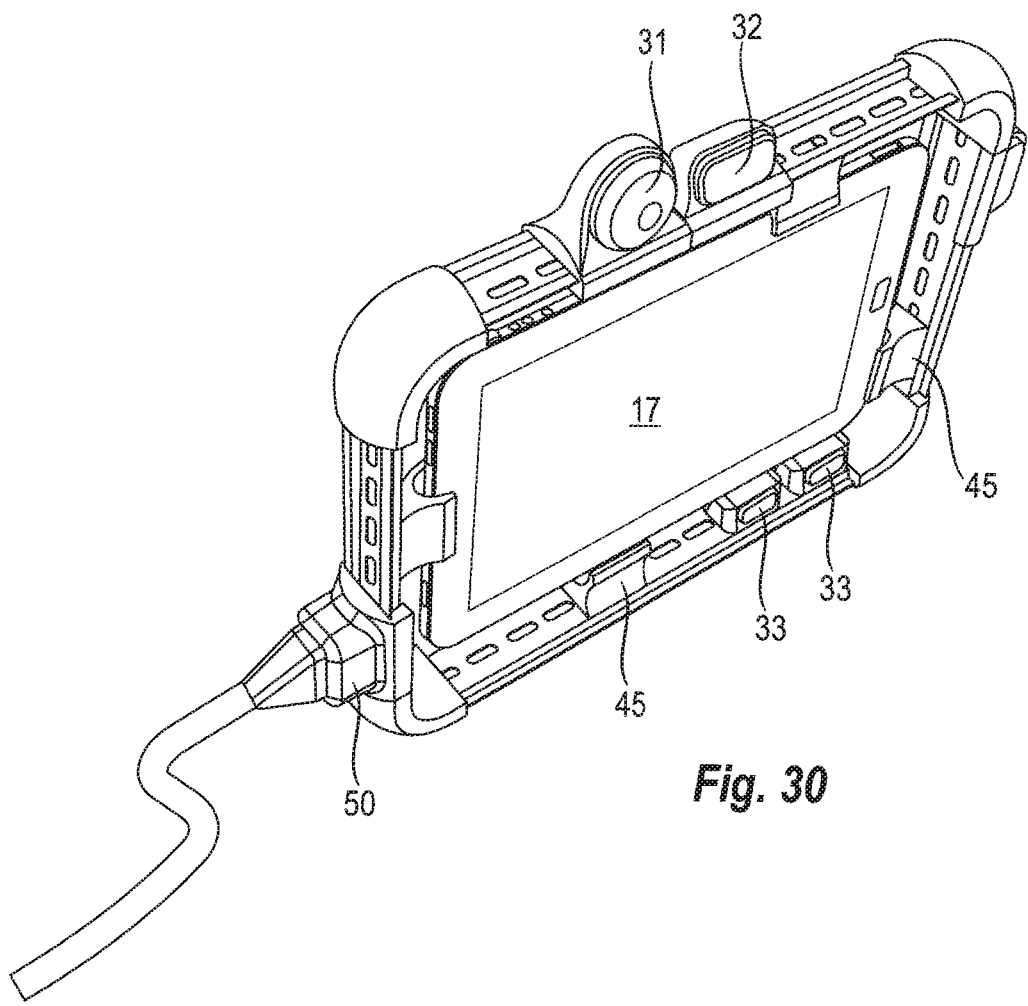

As illustrated in particular in FIG. 29, the operability or accessibility of the keys by the operator using his hand can be ensured on the edge through the gap that is defined by the spacers 45. Data ports, such as a USB port or a FireWire port, can either be led in the gap toward the front via an angle adapter, or can be used in a standard manner via an additional opening in the frame.

The power and signal lines of the additional operating elements can be led in the profile carrier and through the corner connectors 47 to the connecting plug 50. The wires are thereby bundled in an interface. The data and power lines of the handheld robot operation unit 15, such as electricity, network and screen cables for example, can likewise be led bundled to the outside via this interface. Adapter wires can also be led within the frame structure and covered by the profile covers 49 and the corner connectors 47.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A handheld robot operation unit, comprising:
   a basic safety control device;
   a mobile terminal device; and
   a holder configured to mount the mobile terminal device on the basic safety control device;
   the holder comprising at least one adapter device configured to mechanically connect the mobile terminal device to the basic safety control device;
   wherein the basic safety control device comprises a first handheld operation unit part and at least one second handheld operation unit part that is selectively adjustable relative to the first handheld operation unit part;
   the first and second handheld operation unit parts selectively adjustable between at least a first compact configuration that forms a reduced contour handheld robot operation unit, and a second expanded configuration wherein the second handheld operation unit part is offset from the first handheld operation unit part and the handheld robot operation unit accommodates the mobile terminal device with the adapter device, wherein the first and second handheld operation parts abut one another in the first configuration to define the reduced contour handheld robot operation unit; and
   wherein the basic safety control device is operable in the first, compact configuration to generate signals that control a robot without the mobile terminal device.

2. The handheld robot operation unit of claim 1, wherein:
   the adapter device comprises at least one adjustable holding element having at least a closed position and an open position;
   in the closed position, the adjustable holding element connects the mobile terminal device with the basic safety control device in at least one of a form-locking or a force-locking manner; and
   in the open position, the adjustable holding element mechanically releases the mobile terminal device for separation from the basic safety control device.

3. The handheld robot operation unit of claim 2, wherein the adjustable holding element connects the mobile terminal device with the basic safety control device on at least two diagonally opposite corners of the mobile terminal device in the closed position.

4. The handheld robot operation unit of claim 1, wherein the basic safety control device comprises at least one of:
   at least one emergency stop;
   at least one enabling device;
   at least one operating mode selector; or
   a display.

5. The handheld robot operation unit of claim 4, wherein at least one of the first or second handheld operation unit parts comprises the at least one of the at least one emergency stop, the at least one enabling device, the at least one operating mode selector, or the display.

6. The handheld robot operation unit of claim 4, wherein the display is an electronic display.

7. The handheld robot operation unit of claim 1, wherein, the basic safety control device comprises at least one of:
   at least one emergency stop,
   at least one enabling device,
   at least one operating mode selector, or
   a display; and
in the first compact configuration, the basic safety control device is controlled by at least one of:
   the at least one emergency stop,
   the at least one enabling device, or
   the at least one operating mode selector.

8. The handheld robot operation unit of claim 1, wherein:
the adapter device comprises at least one adjustable holding element having at least a closed position and an open position;
in the closed position, the adjustable holding element connects the mobile terminal device with the basic safety control device in at least one of a form-locking or a force-locking manner;
in the open position, the adjustable holding element mechanically releases the mobile terminal device for separation from the basic safety control device; and
at least one of the first handheld operation unit part or the second handheld operation unit part forms the adapter device, and/or the second handheld operation unit part comprises the adjustable holding element.

9. The handheld robot operation unit of claim 8, wherein the first handheld operation unit part forms the adapter device, and the second handheld operation unit part comprises the adjustable holding element.

10. The handheld robot operation unit of claim 1, wherein the adapter device comprises at least one elastically deformable holding element configured to connect the mobile terminal device to the basic safety control device under elastic pretension.

11. The handheld robot operation unit of claim 1, wherein the adapter device comprises at least one exchangeable holding element that is selectively connectable and releasable with the basic safety control device, and is received over at least one edge section of the mobile terminal device in at least one of a form-locking or a force-locking manner.

12. The handheld robot operation unit of claim 11, wherein the at least one exchangeable holding element is a frame-shaped exchangeable holding element.

13. The handheld robot operation unit of claim 1, wherein the adapter device comprises a multi-part frame that comprises individual struts and corner connectors connecting the individual struts.

14. A handheld robot operation unit, comprising:
a basic safety control device;
a mobile terminal device; and
a holder configured to mount the mobile terminal device on the basic safety control device;
the holder comprising at least one adapter device configured to mechanically connect the mobile terminal device to the basic safety control device;
wherein the basic safety control device comprises a first handheld operation unit part and at least one second handheld operation unit part that is selectively adjustable relative to the first handheld operation unit part;
the first and second handheld operation unit parts selectively adjustable between at least a first compact configuration that forms a reduced contour handheld robot operation unit, and a second expanded configuration wherein the second handheld operation unit part is offset from the first handheld operation unit part and the handheld robot operation unit accommodates the mobile terminal device with the adapter device, wherein the first and second handheld operation parts abut one another in the first configuration to define the reduced contour handheld robot operation unit;
wherein the adapter device comprises a multi-part frame that comprises individual struts and corner connectors connecting the individual struts; and
wherein:
   at least one of the struts is configured as a rail to which a spacer is adjustably mounted along a longitudinal extension of the rail and is received over an edge section of the mobile terminal device in at least one of a form-locking or a force-locking manner; or
   at least one of the struts comprises multiple mounting locations disposed at intervals along a longitudinal extension of the strut, and a spacer that is received over an edge section of the mobile terminal device in at least one of a form-locking or a force-locking manner is mounted to at least one of the mounting locations.

15. A handheld robot operation unit, comprising:
a basic safety control device;
a mobile terminal device; and
a holder configured to mount the mobile terminal device on the basic safety control device;
the holder comprising at least one adapter device configured to mechanically connect the mobile terminal device to the basic safety control device;
wherein the basic safety control device comprises a first handheld operation unit part and at least one second handheld operation unit part that is selectively adjustable relative to the first handheld operation unit part;
the first and second handheld operation unit parts selectively adjustable between at least a first compact configuration that forms a reduced contour handheld robot operation unit, and a second expanded configuration wherein the second handheld operation unit part is offset from the first handheld operation unit part and the handheld robot operation unit accommodates the mobile terminal device with the adapter device, wherein the first and second handheld operation parts abut one another in the first configuration to define the reduced contour handheld robot operation unit; and
wherein:
the adapter device comprises a multi-part frame that comprises individual struts and corner connectors connecting the individual struts;
the basic safety control device comprises multiple control components accommodated in separate housings; and
at least one of the multiple housings is mounted on at least one of the individual struts or corner connectors.

16. The handheld robot operation unit of claim 15, wherein the multiple control components comprise at least one of:
   at least one emergency stop;
   at least one enabling device; or
   at least one operating mode selector.

17. The handheld robot operation unit of claim 15, wherein at least one of the multiple housings is mounted on at least one of the individual struts or corner connectors in a manually removable manner.

18. The handheld robot operation unit of claim 1, wherein the mobile terminal device comprises:
a program-controlled electronic data processor including a non-transitory computer-readable storage medium;
a touch display; and a program stored on the electronic data processor and operated via the touch display;

the program, when executed by the data processor, configured to perform at least one of:
   compiling robot programs, or
   controlling a robot.

19. The handheld robot operation unit of claim 18, wherein the program, when executed by the data processor, controls the robot to move a robot arm.

* * * * *